(12) United States Patent
Dodd et al.

(10) Patent No.: US 6,907,531 B1
(45) Date of Patent: Jun. 14, 2005

(54) METHOD AND SYSTEM FOR IDENTIFYING, FIXING, AND UPDATING SECURITY VULNERABILITIES

(75) Inventors: Timothy D. Dodd, Tucker, GA (US); Scott Mewett, Holloways Beach (AU); Curtis E. Ide, Roswell, GA (US); Kevin A. Overcash, Atlanta, GA (US); David A. Dennerline, Atlanta, GA (US); Bobby J. Williams, Atlanta, GA (US); Martin D. Sells, Canton, GA (US)

(73) Assignee: Internet Security Systems, Inc., Atlanta, GA (US)

( * ) Notice: Subject to any disclaimer, the term of this patent is extended or adjusted under 35 U.S.C. 154(b) by 932 days.

(21) Appl. No.: 09/608,282

(22) Filed: Jun. 30, 2000

(51) Int. Cl.[7] .................. G06F 11/30; G06F 12/14; G06F 15/16; H04L 1/00; H04L 9/00
(52) U.S. Cl. .................. 713/201; 713/165; 709/224
(58) Field of Search .................. 713/200, 201, 713/165, 502; 709/223, 224, 232

(56) References Cited

U.S. PATENT DOCUMENTS

| | | |
|---|---|---|
| 4,819,234 A | 4/1989 | Huber |
| 5,278,901 A | 1/1994 | Shieh et al. |
| 5,345,595 A | 9/1994 | Johnson et al. |
| 5,414,833 A | 5/1995 | Hershey et al. |
| 5,475,839 A | 12/1995 | Watson et al. |
| 5,586,260 A | 12/1996 | Hu |
| 5,590,331 A | 12/1996 | Lewis et al. |
| 5,606,668 A | 2/1997 | Shwed |
| 5,623,601 A | 4/1997 | Vu |
| 5,630,061 A | 5/1997 | Richter et al. |
| 5,761,504 A | 6/1998 | Corrigan et al. |
| 5,764,887 A | 6/1998 | Kells et al. |
| 5,764,890 A | 6/1998 | Glasser et al. |
| 5,787,177 A | 7/1998 | Leppek |
| 5,796,942 A | 8/1998 | Esbensen |
| 5,798,706 A | 8/1998 | Kraemer et al. |
| 5,815,574 A | 9/1998 | Fortinsky |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,857,191 A | 1/1999 | Blackwell, Jr. et al. |
| 5,864,665 A | 1/1999 | Tran |
| 5,875,296 A | 2/1999 | Shi et al. |
| 5,881,236 A | 3/1999 | Dickey |
| 5,884,033 A | 3/1999 | Duvall et al. |
| 5,950,012 A | 9/1999 | Shiell et al. |
| 5,964,839 A | 10/1999 | Johnson et al. |
| 5,983,270 A | 11/1999 | Abraham et al. |
| 5,983,348 A | 11/1999 | Ji |

(Continued)

FOREIGN PATENT DOCUMENTS

| | | |
|---|---|---|
| WO | WO 00/54458 | 9/2000 |
| WO | WO 01/84285 | 11/2001 |
| WO | WO 02/06928 | 1/2002 |
| WO | WO 02/056152 | 7/2002 |

*Primary Examiner*—Andrew Caldwell
*Assistant Examiner*—Tamara Teslovich
(74) *Attorney, Agent, or Firm*—King & Spalding LLP

(57) ABSTRACT

A method and system identifies, fixes, and updates security vulnerabilities in a host computer or host computers. The present invention can communicate between a scanner with plug-in capability, an operating system, and an express update package.

The architectural set-up can allow exploits within the scanner and exploits in the express update package to function with no knowledge of each other. The user also needs no knowledge of whether the exploits are within the scanner or the express update package. Mutual authentication procedures can enable the scanner to load only legitimate express update packages, and can provide that express update packages can only be loaded into legitimate scanners.

48 Claims, 18 Drawing Sheets

U.S. PATENT DOCUMENTS

| | | |
|---|---|---|
| 5,987,606 A | 11/1999 | Cirasole et al. |
| 5,987,611 A | 11/1999 | Freund |
| 6,014,645 A | 1/2000 | Cunningham |
| 6,016,553 A | 1/2000 | Schneider et al. |
| 6,026,442 A | 2/2000 | Lewis et al. |
| 6,041,347 A | 3/2000 | Harsham et al. |
| 6,061,795 A | 5/2000 | Dircks et al. |
| 6,085,224 A | 7/2000 | Wagner |
| 6,088,803 A | 7/2000 | Tso et al. |
| 6,098,173 A | 8/2000 | Elgressy et al. |
| 6,119,234 A | 9/2000 | Aziz et al. |
| 6,266,774 B1 | 7/2001 | Sampath et al. |
| 6,275,938 B1 | 8/2001 | Bond et al. |
| 6,282,546 B1 * | 8/2001 | Gleichauf et al. .......... 707/102 |
| 6,301,668 B1 * | 10/2001 | Gleichauf et al. .......... 713/201 |
| 6,324,647 B1 * | 11/2001 | Bowman-Amuah ......... 713/201 |
| 6,324,656 B1 * | 11/2001 | Gleichauf et al. ............ 714/37 |
| 6,405,318 B1 | 6/2002 | Rowland |
| 6,415,321 B1 * | 7/2002 | Gleichauf et al. .......... 709/224 |
| 6,519,647 B1 * | 2/2003 | Howard et al. ............. 709/229 |

\* cited by examiner

METHOD AND SYSTEM FOR IDENTIFYING, FIXING, AND UPDATING SECURITY VULNERABILITIES

TECHNICAL FIELD

This invention relates to network communications for computers, and more particularly, to operating system security over open networks.

BACKGROUND OF THE INVENTION

As Internet technology has advanced, users are able to access information on many different operating systems. Hackers take advantage of the open network architecture of the Internet, and attempt to gain access to operating systems without authorization. Hackers present a significant security risk to information stored on a operating system. In an effort to limit unauthorized access to operating system resources, many operating system communication security devices and techniques have been developed.

One security device and technique that has been used to secure operating system resources is an Internet scanner. A scanner enables a user to find and report security vulnerabilities in network-enabled operating systems. The scanner can run a list of checks, or exploits, that verify the presence or absence of known security vulnerabilities. The exploits' findings are displayed to the user, and reports may be generated showing the discovered security vulnerabilities and methods for fixing them.

Although scanners are very useful, they lack services that users need to adequately protect their operating systems. The release cycle of a scanner is long compared to the time required to develop and test individual security checks. New security vulnerabilities are introduced very rapidly, and must be found and addressed in real-time. Because hackers create problems in systems on a minute-to-minute basis, a scanner must be updated constantly to be most valuable to a user.

What is needed is a method and system for providing updated exploit information in a short time period. A scanner needs to have its components sufficiently separated so that individual information used in the scanner can be updated independently. A scanner's individual security exploits need to be updated and released independently of the entire scanner's release cycle. The exploit information needs to be available on an per-exploit basis so that minor, but important, modifications can be made without affecting the entire system. In addition, exploit information, including help information, needs to be updated independently of the exploit itself.

A further need in the art exists for a user-friendly scanner with the above update capability. The user needs to be able to use the system without needing to know whether the exploits are included in the scanner or are separately installed via update procedures.

A further need in the art exists for a scanner with the above update capability that includes mutual authentication procedures. Constant update packages necessitate ensuring that the scanner will only load legitimate updates, and that updates will only be loaded into legitimate scanners.

SUMMARY OF THE INVENTION

The present invention satisfies the above-described needs by providing a system and method for identifying, fixing, and updating security vulnerabilities in host computers. In an exemplary embodiment, the identifying, fixing, and updating capabilities can be done by communication between a scanner with plug-in capability, an operating system, and an express update package.

The express update package can contain exploit plug in modules, resource plug-in modules dat files, and help files. The exploit plug-in modules and the resource plug-in modules can be dynamic-link libraries (DLLs). The exploit plug-in module can contain exploit objects and the resource plug-in module can contain resource objects. The exploit objects can contain exploits and the resource objects can contain resources. An exploit can be an individual security check that is done on a computer or systems. A resource can be an individual resource that is used by the scanner, and can include data, executable code, or a network connection.

The present invention can yield an architectural solution that allows the exploits within the scanner, and the exploits in the express update package, to function with no knowledge of each other. Because the exploit objects and the resource objects can hide their implementation details behind standard interfaces, they may be managed and manipulated by the scanner without knowledge of their internal make-up. This architectural solution can allow existing exploits to be modified and incorporated into the scanner without updating the entire scanner. In addition, new exploits may be added to the scanner without updating the entire scanner. The present invention can be user-friendly in that the user needs no knowledge regarding whether the exploits are included in the scanner's installation package or are separately installed via update procedures.

The present invention can also include mutual authentication procedures. The authentication procedures can enable the scanner to load only legitimate plug-in modules, and can provide that plug-in modules can only be loaded into legitimate scanners.

DETAILED DESCRIPTION OF EXEMPLARY EMBODIMENTS

The present invention can be a method of identifying, fixing, and updating security vulnerabilities in a host computer or computers. In an exemplary embodiment, the identifying, fixing, and updating capabilities can be done by communication between a scanner with plug-in capability, an operating system, and a plug-in module. Because the, exploit objects and the resource objects can hide their implementation details behind standard interfaces, they may be managed and manipulated by the scanner without knowledge of their internal make-up. This architectural solution can allow existing exploits to be modified and incorporated into the scanner without updating the entire scanner. In addition, new exploits may be added to the scanner without updating the entire scanner. Mutual authentication procedures can also be used to ensure that only legitimate scanners and express update package contents are used.

Figure 1:
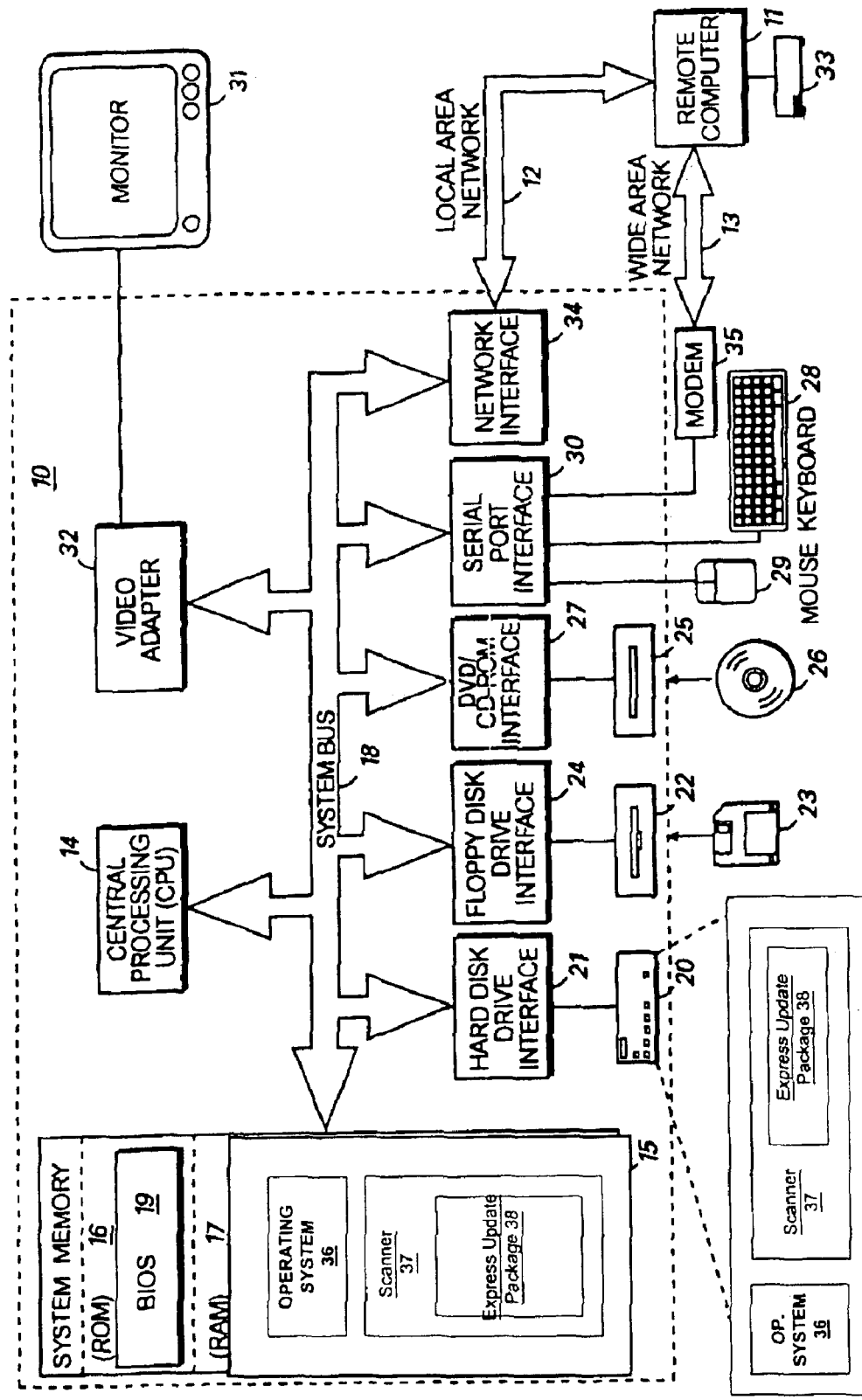
FIG. 1 is a block diagram of a personal computer that provides an exemplary operating environment for an exemplary embodiment of the present invention.
Figure 2:
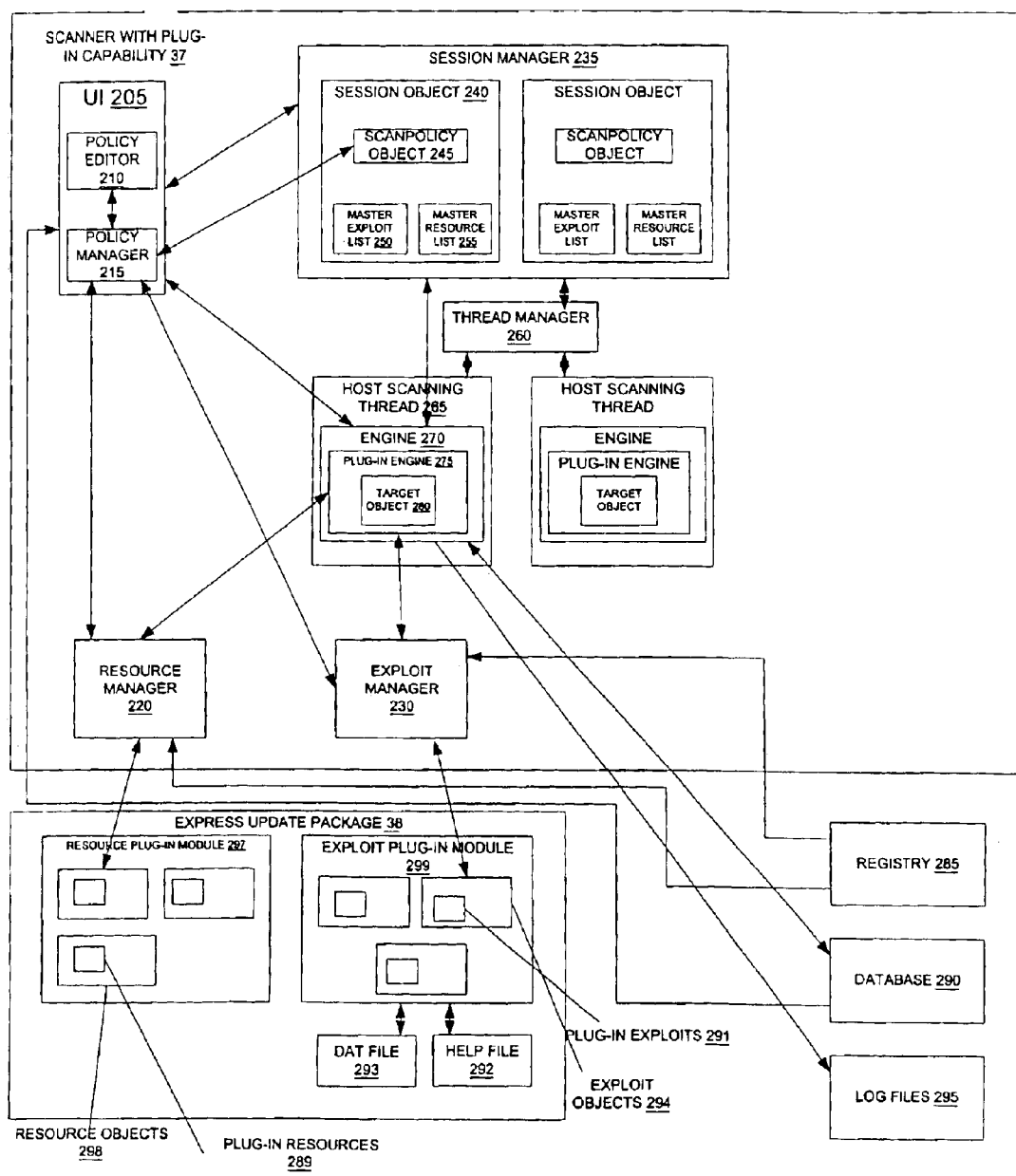
FIG. 2 is a block diagram illustrating internal program objects of an exemplary embodiment which can report actions between an operating system, a scanner with plug-in capability, and an express update package.

FIG. 1 is a block diagram of a personal computer that provides an exemplary operating environment. FIG. 2 is a block diagram illustrating internal program objects. FIGS. 3–7 are screen displays showing the user interface (UI) component for an exemplary embodiment of the present invention. FIGS. 8–18 are flowchart diagrams illustrating exemplary methods for identifying, fixing, and updating security vulnerabilities in a host computer or computers.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, display devices, and input devices. Furthermore, these processes and operations may utilize conventional computer components in a heterogeneous distributed computing environment, including remote file servers, remote compute servers, and remote memory storage devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, objects, properties, flags, types, identifiers, values, elements, symbols, characters, terms, numbers, points, records, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as comparing, selecting, viewing, getting, giving, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hardwired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates various aspects of an exemplary computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

The Computer Hardware

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a CPU 14. The personal computer also includes system memory 15 (including read only memory (ROM) 16 and random access memory (RAM) 17), which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM or DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36 and data are provided to the personal computer 10 via computer readable media. In the preferred computer, the computer-readable media include the local or remote memory storage devices, which may include the local hard disk drive 20, floppy disk 23, CD-ROM or DVD 26, RAM 17, ROM 16, and the remote memory storage device 33. In the preferred personal computer 10, the local hard disk drive 20 is used to store data and programs, including the operating system 36 and the scanner 37.

The focus of the express update package 38 is described below in a manner that relates to its use in a scanner 37 with plug-in capability of FIG. 1. This description is intended in all respects to be illustrative rather than restrictive. Alternative embodiments will be apparent to those skilled in the art.

The Internal Objects

FIG. 2 is a block diagram illustrating internal program objects of an exemplary embodiment which can report actions between an operating system 36, a scanner 37 with plug-in capability, and an express update package 38. The scanner 37 can include a UI 205, a session manager 235, a thread manager 260, host-scanning threads 265, an engine 270, an exploit manager 230, and a resource manager 220. The present invention also can access a registry 285, a database 290, and some scanner log files 295.

An express update package 38 can contain exploit plug-in modules 299, resource plug-in modules 297, dat files 293, and help file 292. The exploit plug-in modules 299 and the resource plug-in modules 297 can be DLLs. An exploit plug-in module 299 can contain one or more exploit objects 294. An exploit object 294 can be a container for a plug-in exploit 291. The plug-in exploit 291 can be an individual exploit, or security check, that is done on the host computer or computers.

The resource plug-in module 297 can contain one or more resource objects 298. A resource object 298 can contain a plug-in resource 289. The plug-in resource 289 can be an individual resource that is used by the scanner 37. The resources may include data, executable code, or a network connection. Examples of resources are a list of known accounts on a host or an open file transfer protocol (FTP) connection. Because the plug-in exploits 291 that produce and consume shared resources can be added to the scanner 37 installation dynamically, the resources can also have plug-in capability, and can be packaged and delivered separately from the scanner 37. Like the exploit objects 294, the resource objects 298 can expose standard interfaces enabling the scanner 37 to manage them without any knowledge of their function or purpose.

There can be several basic type of resources. A mandatory resource can be one that an exploit must have in order to perform successfully. An optional resource can be one that an exploit can use if the resource exists, but is not necessary for the exploit to function properly. A create-on-demand (C-O-D) resource can be a resource that is created the first time it is requested. Afterwards, when a requested C-O-D resource already exits, the requester will get the C-O-D resource, instead of having the resource recreated. A create-unique resource can be a resource that is always created afresh when requested, so that the requestor is guaranteed that the resource is unique and will not be accessed or used by any other requestor.

When a resource is created, it can be assigned a name space based on its scope. The scope of a resource can be an indication of its specificity, and can include host-specific resources, session-specific resources, and global resources. A host-specific resource can only be used by exploits running against the host and in the session to which a resource belongs. A session-specific resource can be used only by exploits running against a host in the scan session to which the resource belongs. A global resource can be used by any exploit in any scan session.

The separation of the resources and the exploits in the resource objects 298 and the exploit objects 294 is a key idea in the architecture, and has substantial benefits. The scanner 37 can be more efficient because a resource required by multiple exploits only needs to be created once, instead of once for each of the exploits. The scanner 37 can also be more flexible because the resources and the exploits may be updated independently of each other. In addition, because the exploit objects 294 and the resource objects 298 can hide their implementation details behind standard interfaces, they may be managed and manipulated by an application, such as the scanner 37, that does not know of their internal make-up. This can yield an architectural solution where the exploit need have no knowledge of the other exploits that produce or consume its resources.

The dat file 293 can store exploit attribute information for all of the exploits in the express update package 38. There can be one dat file 293 for each exploit plug-in module 299. When queried for its attribute information, the exploit reads the pertinent data from the dat file 293. The separation of the exploit attribute information from the exploit object 294 itself allows the exploit object 294 and the dat file 293 to be updated independently. This separation also allows only some dat files 293 to be updated if other dat files 293 do not need to be updated or changed.

The help file 292 can contain on-line help information associated with the exploit objects 294 that can be contained in the exploit plug-in module 299. When a user requests help, the scanner 37 can read the information from the file and display it in the UI 205. The separation of the exploit's help information from the exploit object 294 can allow the help file 292 and the exploit object 294 to be updated independently of one another.

An exploit manager 230 manages the exploit objects 294 and a resource manager 220 manages the resource objects 298. The exploit manager 230 and the resource manager 220 can access the exploit objects 294 contained in the exploit plug-in module 299 and the resource objects 298 contained in the resource plug-in module 297. The exploit manager 230 and the resource manager 220 can convey exploit objects 294 and resource objects 298 to the policy manager 215 and plug-in engine 275.

The UI 205 can exchange information with the user. The UI 205 can include a policy editor 210 and a policy manager 215. The policy editor 210 can allow a user to examine modify create and configure policies; acquire on-line documentation about any exploit: perform keyword searches on the on-line documentation; and alter the current presentation of information based on category choices or search results. Policy information can be a scan configuration, consisting of a set of enabled exploits and any necessary parameters for those exploits. The policy manager 215 can pass exploit policy information to and from the policy editor 210 via a scanpolicy object 245. In addition, the policy manager 215 can acquire exploit objects 294 from the exploit manager 230 and resource objects 298 from the resource manager 220, and then can create the scanpolicy objects 245. A scanpolicy object 245 can be a container for policy information, and can expose interfaces enabling the scanner 37 components to query it for this information. When used in a scan session, the scanpolicy object 245 can be stored in a session object 240.

The session object 240 can contain all information necessary to run a scan session. A scan session can run a series of exploits for one or more hosts. The engine 270 can query the session object 240. The session object 240 can contain: the scanpolicy object 245 identifying enabled exploits and their parameters; a list of hosts to scan; a master exploit list 250; a master resource list 255, and a license file. The session object 240 can construct the master exploit list 250 and the master resource list 255. The scanpolicy object 245 can be built by the policy manager 215 and the scanpolicy object 245 can be used to construct the master exploit list 250 and master resource list 255. The master exploit list 250 can contain information about all the plug-in exploits 291 enabled for a scan session. For each plug-in exploit 291, the master exploit list 250 can contain its exploit object 294 and information about any resource objects 298 produced or consumed by the exploit. The master resource list 255 can contain information about the resources needed for a scan session. For each resource, the list contains its resource object 298, and information about any exploits that produce or consume the resource.

A session manager 235 can contain and manage the scan sessions as represented by session objects 240. The session manager 235 can exchange scan configuration setting information with a thread manager 260. The session manager 235 can ensure that host-scanning threads 265 are allocated equitably among the various session objects 240. The UI 205 and the engine 270 can query the session manager 235 for information on what host to scan, scan configuration settings, etc. The thread manager 260 can get information from the session manager 235 that describes when a new session has been created, the number of hosts in a session and scan configuration parameters. The thread manager 260 can also create the host-scanning threads 265. The host-scanning thread 265 can tell the thread manager 260 when it is finished with a scan session. Otherwise, the host-scanning thread 265 can communicate with the session manager 235 to get host information.

The engine 270 can run the built-in exploits. The plug-in engine 275 can be included in the engine 270 and can ran the plug-in exploits 291, and can contain the target object 280 and a copy of the master exploit list 250 and master resource list 255. The resources that are produced and consumed by various exploits can create dependencies among exploits. The plug-in engine 275 can run the plug-in exploits 291 in a particular order. There can be a plug-in engine 275 instance for each host. The plug-in engine 275 can query the session manager 235 and can make its own copies of the master exploit list 250 and the master resource list 255. The plug-in engine 275 can then use its copy of the master exploit list 250 and the master resource list 255 to run the plug-in exploits 291. The master exploit list 250 and the master resource list 255 can have information on each exploit and resource. In particular, these lists 250 and 255 can be used to determine the order of running the plug-in exploits 291.

The target objects 280 can be containers that provide a means of communication between the plug-in engine 275 and the exploit objects 294. The plug-in engine 275 can create a target object 280, and can reuse the same target object 280 for each plug-in exploit 291 run against a host. Before executing the plug-in exploit, the plug-in engine 275 can query the exploit object 294 for information on the resources it requires. The plug-in engine 275 can acquire the required resource objects 298 from the resource manager 220 and can put them into the target object 280. The target object 280 can pass the required resource objects 298 into the exploit object 294. The plug-in exploit 291 can then be run, and the exploit object 294 can pass the scan result information into the target object 280. The target object 280 can then return this scan result information to the plug-in engine 275, which updates the UI 205, the database 290, and the scanner log file 295.

The Screen Displays

Turning now to FIGS. 3–7, screen displays showing the UI 205 component for an exemplary embodiment of the present invention are shown.

Figure 3:
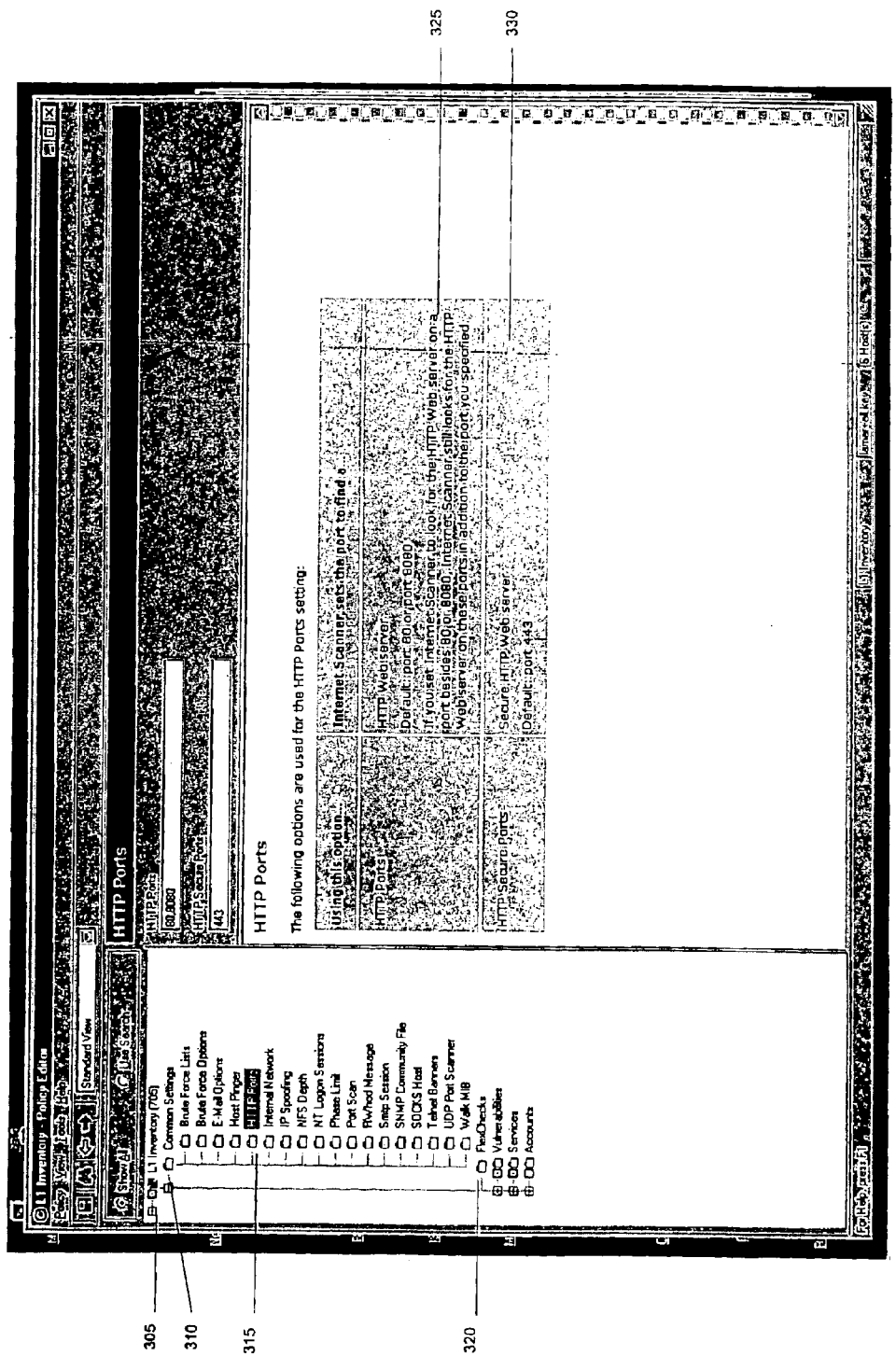
FIG. 3 is a screen display of information the user can access in an Inventory folder in an exemplary embodiment of the present invention.

FIG. 3 is a screen display of the detailed information in an Inventory folder the user can access in an exemplary embodiment of the present invention. Under an Inventory folder 305, there can be a FlexChecks folder 320 and a Common Settings folder 310. The FlexChecks folder 320 can enable a user to write his own checks or exploits to plug in the scanner 37. The Common Settings folder 310 can contain global settings that can be enabled for a policy. These settings may apply to multiple vulnerability checks. An example of information found in the Common Settings folder 310 is the HTTP Ports folder 315. This folder can have two options for using the HTTP Ports setting. One option, the HTTP Ports option 325 allows the user to default and look for port 80 or port 8080, in addition to looking for the specified port. The HTTP Secure Ports option 330 can only look for the specified port or ports.

Figure 4:
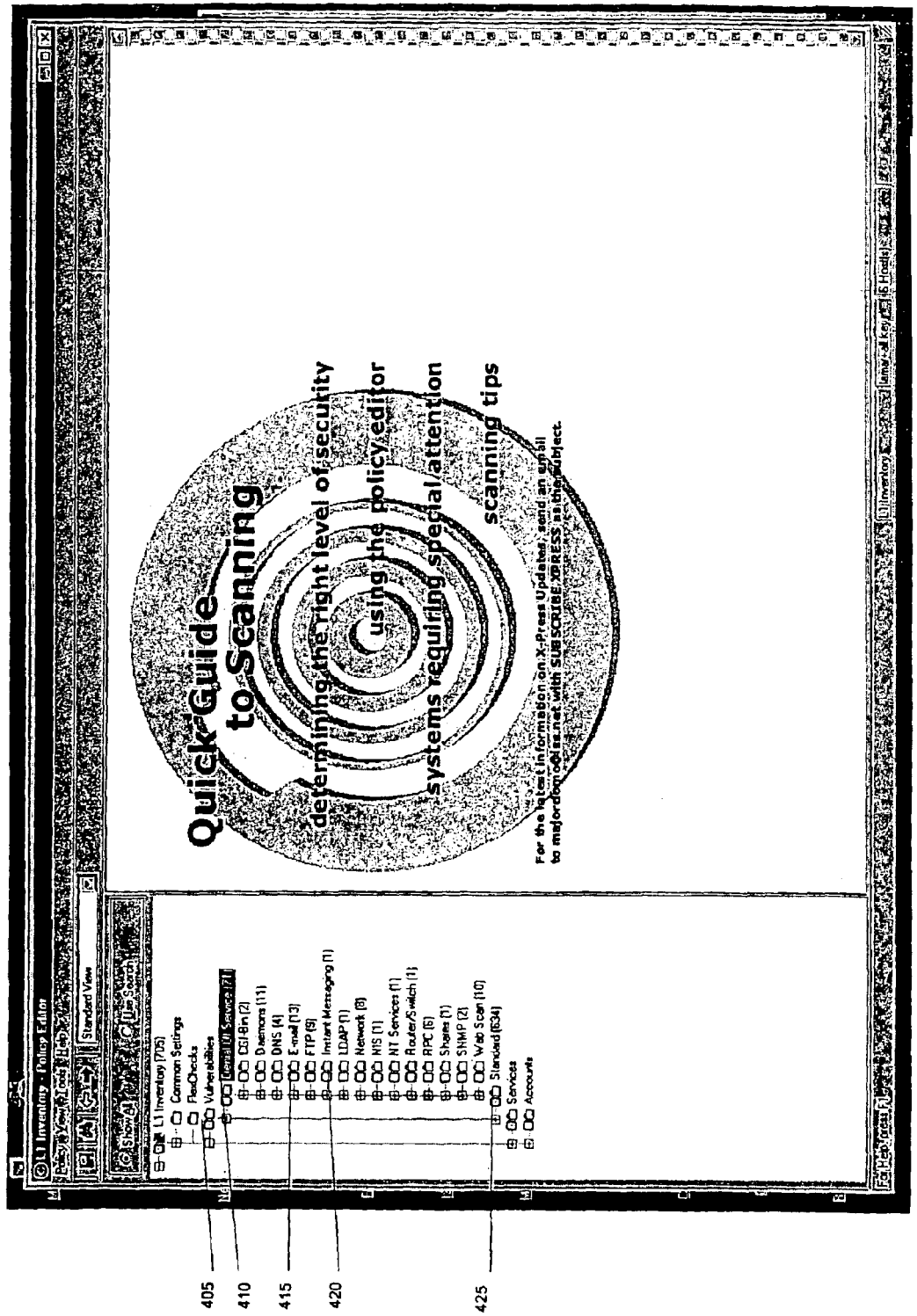
FIG. 4 is a screen display of information the user can access in a Vulnerabilities folder in an exemplary embodiment of the present invention.

FIG. 4 is a screen display of the detailed information the user can access in a Vulnerabilities folder in an exemplary embodiment of the present invention. The Vulnerabilities folder 405 can contain and describe the exploits that check the holes in the operating system 36 which could allow an intruder to gain information and allow improper access. Under the Vulnerability folder 405, there can be a Denial-of-Service folder 410 and a Standard folder 425. The Denial-of-Service folder 410 lists the exploits that have the potential of shutting down a system or service. These include the E-mail 415 and Instant Messaging 420 categories.

The Standard folder 425 can hold numerous categories of standard vulnerabilities, including Backdoors, Browser, E-mail, and Firewalls categories. The exploit details that can be shown in the Vulnerabilities folder 405 include: risk levels, attack names, platforms, descriptions, remedies, references, common vulnerabilities and exposures (CVE), and links to other sources.

Figure 5:
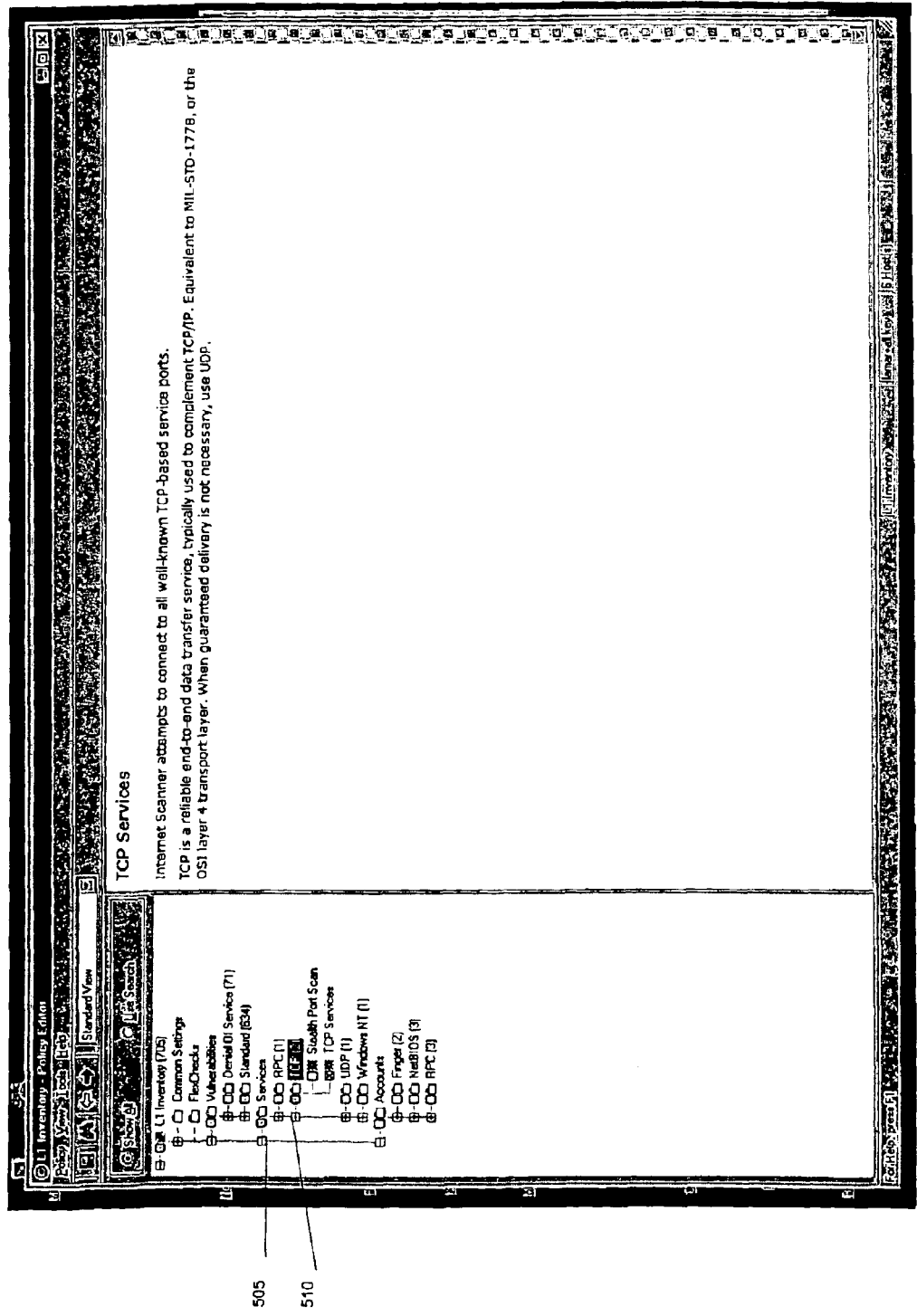
FIG. 5 is a screen display of information the user can access in a Services folder in an exemplary embodiment of the present invention.

FIG. 5 is a screen display of information a user can access in a Services folder in an exemplary embodiment of the present invention. The Services folder 505 can list the types of services that the scanner 37 will attempt to connect to on the user's network. The Service folder 505 can include information such as transmission control protocol (TCP) Services 510, which can attempt to connect to all well-known TCP-base service ports.

Figure 6:
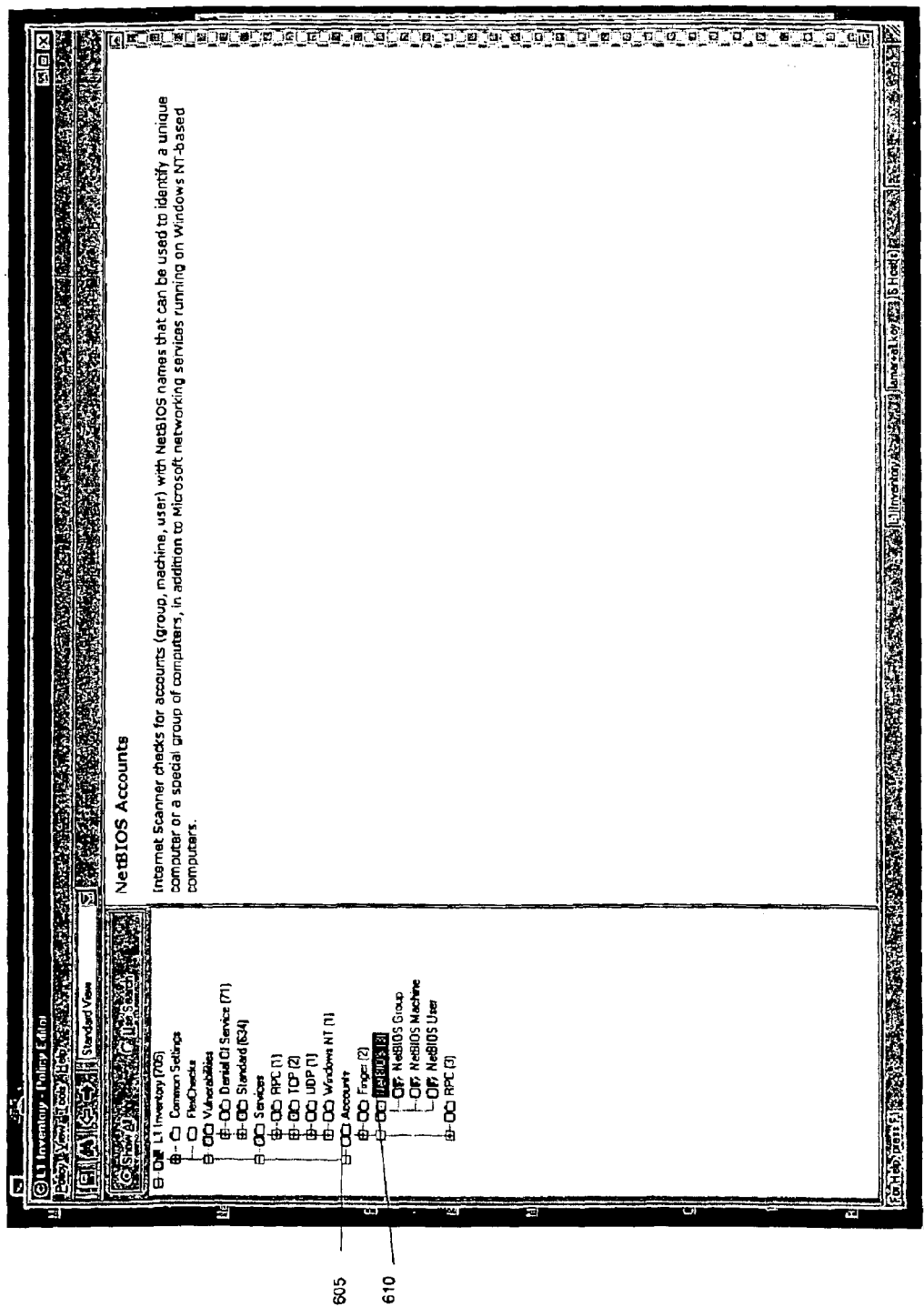
FIG. 6 is a screen display of information the user can access in a Accounts folder in an exemplary embodiment of the present invention.

FIG. 6 is a screen display of information a user can access in an Accounts folder in an exemplary embodiment of the present invention. The Accounts folder 605 can list the types of accounts the scanner 37 checks as it scans the user's network. When accessing the Accounts folder 605, the UI 205 can access an list of accounts under a particular folder's name. For example, a NetBIOS folder 610 can check for accounts with NetBIOS names that can be used to identify a computer. A NetBIOS is an application programming interface (API) that can be used by application programs on a local area network.

Figure 7:
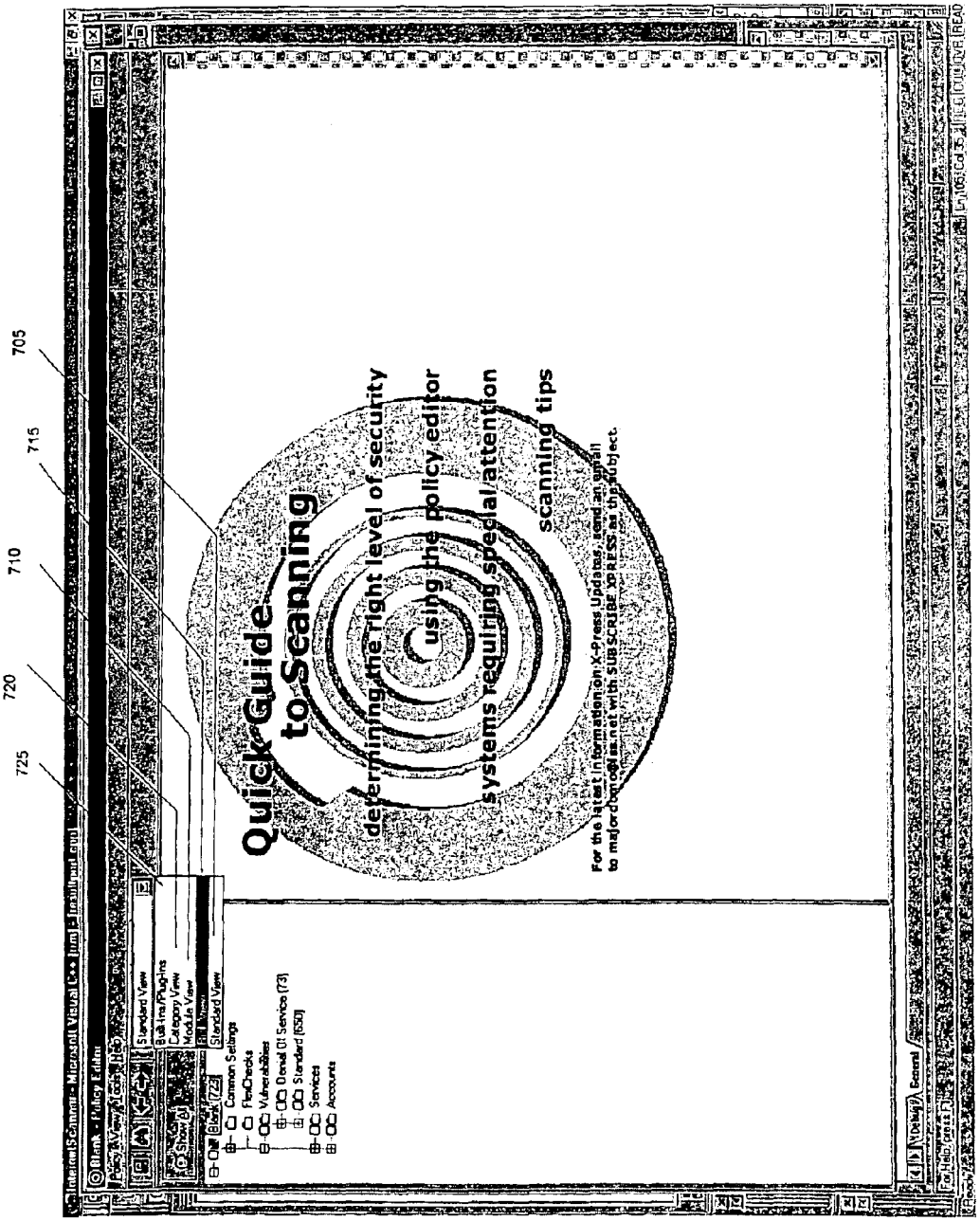
FIG. 7 is a screen display showing the different views the user can access in an exemplary embodiment of the present invention.

FIG. 7 is a screen display showing the different views the user can access in an exemplary embodiment of the present invention. A Standard View 705 can be the default view that displays the exploits in a normal order. A Module View 710 can display which exploits are contained in which plug-in modules. A Risk View 715 can display the exploits in folders according to their level of risk: high, medium, or low. A Category View 720 can display the exploits according to what category of vulnerability it falls under. Some examples of the Category View 720 are E-mail vulnerabilities or Backdoor vulnerabilities. A Built-in/Plug-in View 725 allows the user to see which exploits are built-in exploits and plug-in exploits 291. Outside of this view in the policy editor 210, the user cannot distinguish between the plug-in exploits 291 and built-in exploits. The user cannot distinguish this difference because each built-in exploit has a dummy plug-in object. The dummy plug-in object can be stored in the exploit plug-in module 299. The dummy plug-in objects can look like the regular plug-in exploit objects 294 but they are never executed. The UI 205, the policy manager 215, and the help file 292 can access the dummy plug-in object.

The Plug-in Capability

Figure 8:
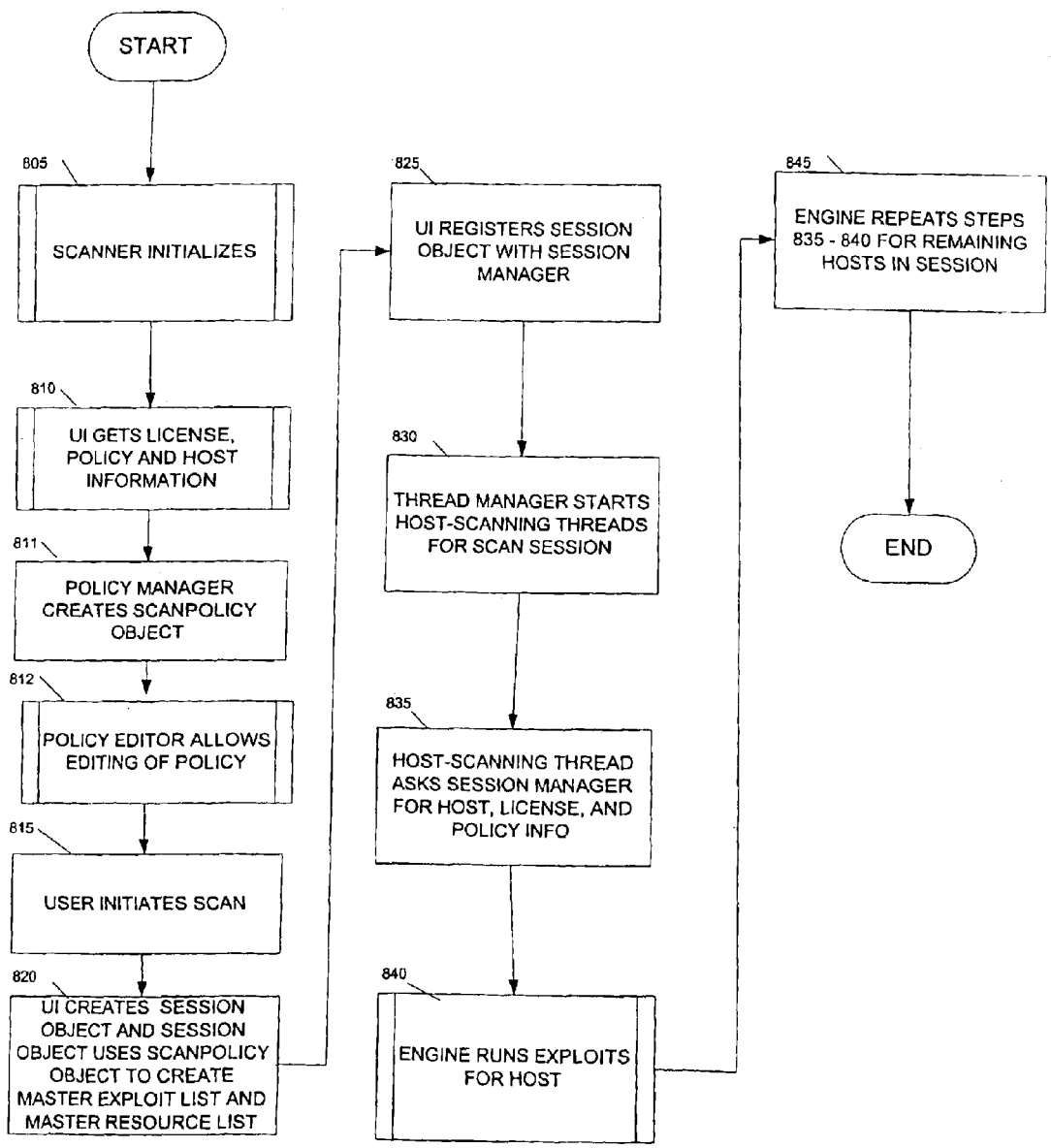
FIG. 8 is a flowchart diagram illustrating an exemplary method for identifying, fixing, and updating security vulnerabilities in a host computer or computers.

FIG. 8 is flowchart diagram illustrating an exemplary method for identifying, fixing, and updating security vulnerabilities in a host computer or computers. In routine 805, the scanner 37 can initialize. In routine 810, the UI 205 can get the license, policy, and host information. In step 811, the policy manager 215 can create the scanpolicy object 245. In routine 812, the policy editor 210 can allow the policy information to be edited. The policy information includes which exploits are enabled, configuration parameters, and common-setting resources. In step 815, the user can initiate a scan. In step 820, the UI 205 can create the session object 240 and the session object 240 can use the scanpolicy object 245 to create the master exploit list 250 and the master resource list 255. In step 825, the UI 205 can register the session object 240 with the session manager 235. In step 830, the thread manager 260 can start host-scanning threads 265 for the scan session. In step 835, the first host-scanning thread can ask the session manager 235 for host, license, and policy information. In routine 840, the engine 270 can run the exploits. In step 845, the engine 270 can repeat steps 835–840 for the remaining hosts in the scan session.

Initializing a Scanner

Figure 9:
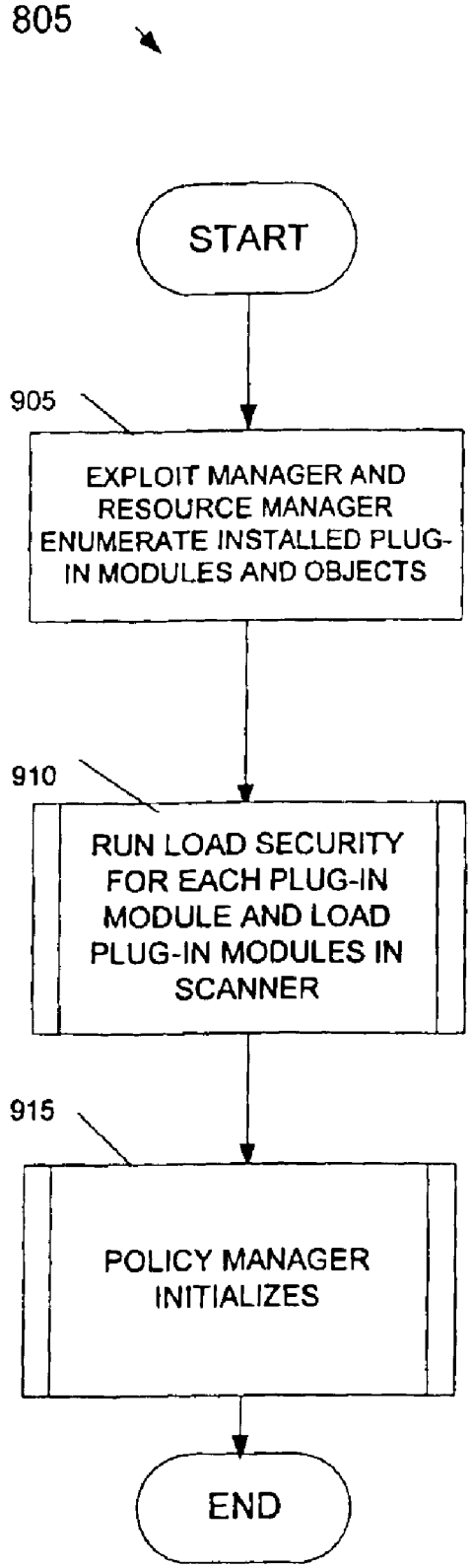
FIG. 9 is a flowchart diagram illustrating an exemplary method for initializing a scanner.

FIG. 9 is a flowchart diagram illustrating an exemplary routine 805 for initializing a scanner 37 as set forth in FIG. 8. In step 905, the exploit manager 230 and resource manager 220 can enumerate the installed exploit plug-in modules 299, resource plug-in modules 297, exploit objects 294, and resource objects 298. In routine 910, load security can be run for each exploit plug-in module 299 and resource plug-in module 297, and these plug-in modules 299 and 297 can be loaded in the scanner 37. In routine 915, the policy manager 215 can initialize.

Figure 10:
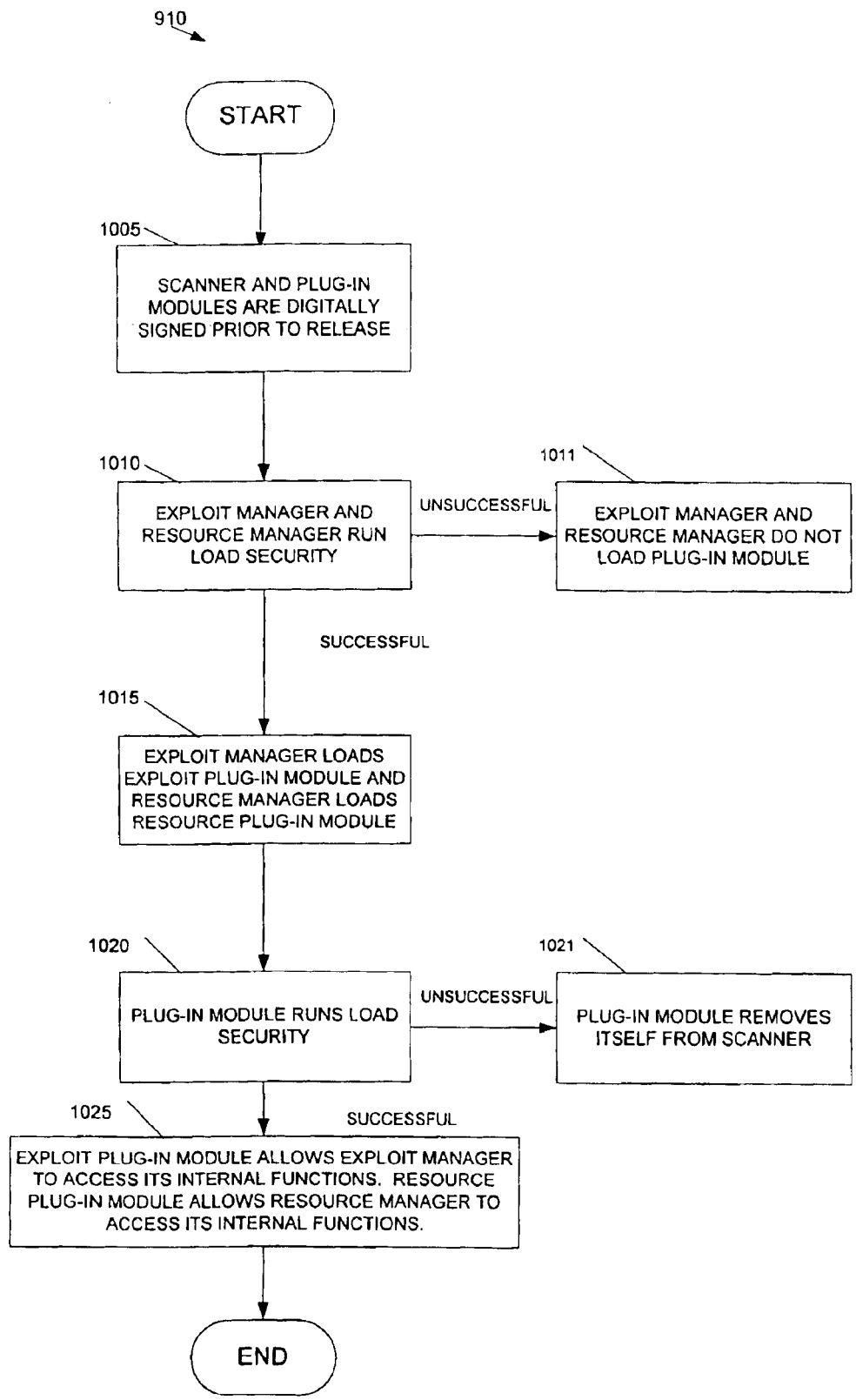
FIG. 10 is a flowchart diagram illustrating an exemplary method for running load security and loading a plug-in module.

FIG. 10 is a flowchart diagram illustrating an exemplary routine 910 for running load security and loading the plug-in modules 299 and 297 in the scanner 37 as set forth in FIG. 9. In step 1005, the scanner 37 and plug-in modules 299 and 297 can be digitally signed prior to release. In step 1010, the exploit manager 230 can run load security on the exploit plug-in modules 299 and the resource manager 220 can run load security on the resource plug-in modules 297. The purpose of load security can be to ensure that only legitimate applications (such as a legitimate scanner 37) may load the plug-in modules 299 and 297 and that the scanner 37 only loads legitimate plug-in modules 299 and 297 Load security can verify the digital signature of the plug-in modules 299 and 297. In step 1011, if the digital signature is incorrect, the load security is unsuccessful, and the scanner 37 will not load the plug-in modules 299 and 297. In step 1015, if the digital signature is correct, then the load security is successful, and the exploit manager 230 can load the exploit plug-in module 299 into the scanner 37, and the resource manager 220 can load the resource plug-in module 297 into the scanner 37. In step 1020, the plug-in module 299 or 297 can run load security, and can verify the digital signature of the scanner 37. In step 1021, if load security is unsuccessful, the plug-in module 299 or 297 can remove itself from the scanner 37. In step 1025, if load security is successful, the exploit plug-in module 299 can allow the exploit manager 230 to access its internal functions, or the resource plug-in module 297 can allow the resource manager 220 to access its internal functions.

Figure 11:
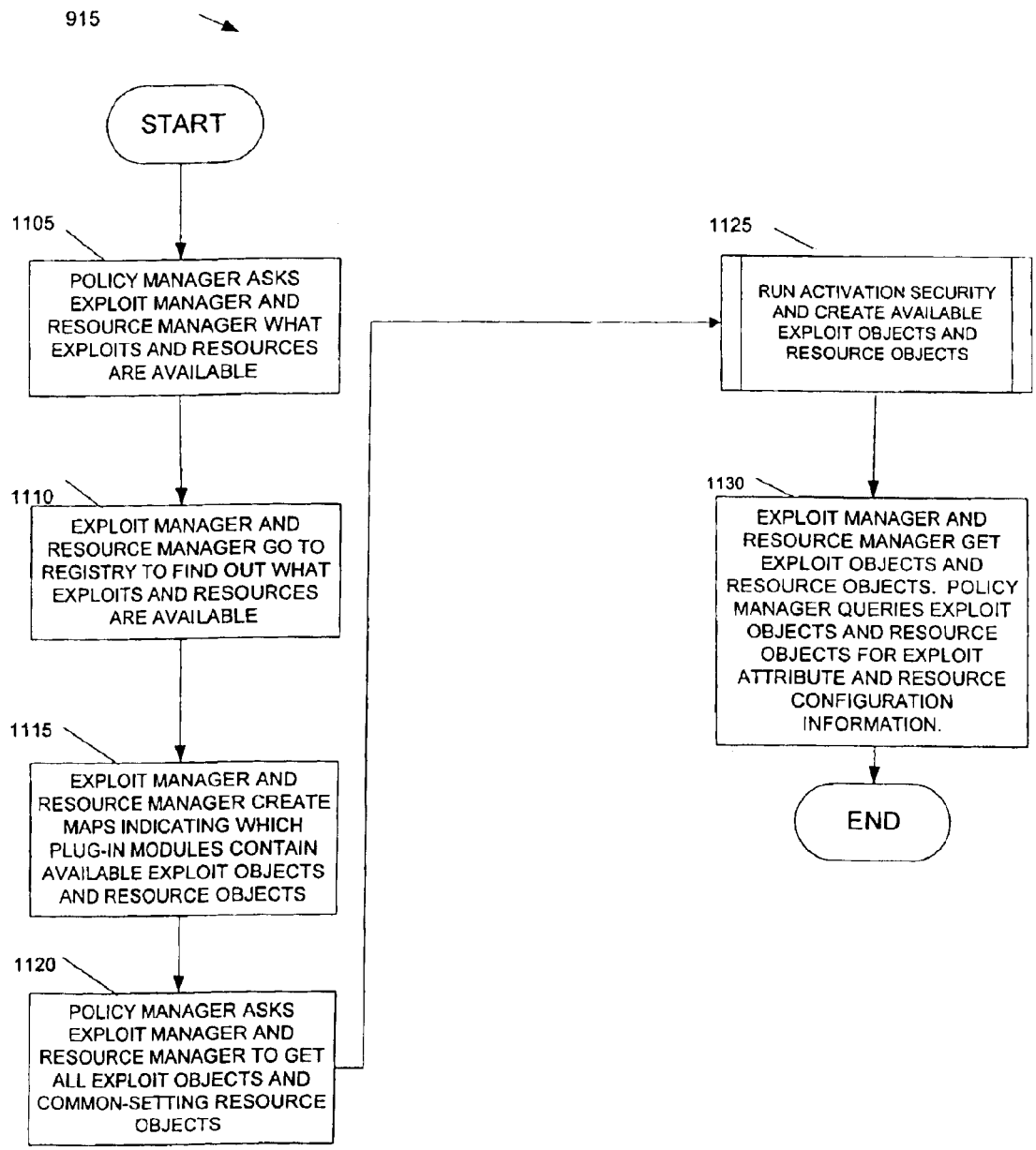
FIG. 11 is a flowchart diagram illustrating an exemplary method for initializing a policy manager.

FIG. 11 is a flowchart diagram illustrating an exemplary routine 915 for initializing the policy manager 215 as set forth in FIG. 9. In step 1105, the policy manager 215 can ask the exploit manager 230 and resource manager 220 what exploits and resources are available. In step 1110, the exploit manager 230 and resource manager 220 can go to the registry 285 to find out what exploits and resources are available. In step 1115, the exploit manager 230 and the resource manager 220 can create maps indicating which of the plug-in modules 299 or 297 contain the available exploit objects 294 and the available resource objects 298. In step 1120, the policy manager 215 can ask the exploit manager 230 and the resource manager 220 to get all the exploits objects 294 and common-setting resource objects 298. The common-setting resource objects 298 can contain configuration information that can be used by multiple exploits. In routine 1125, activation security can be run to ensure that the scanner 37 and the exploit objects 294 and resource objects 298 are legitimate, and the available exploit objects 294 and common-setting resource objects 298 can be created. In step 1130, the exploit manager 230 can get the exploit objects 294 and the resource manager 220 can get the resource objects 298. The exploit manager 230 can return the exploit objects 294 and the resource manager 220 can return the resource objects 298 to the policy manager 215. The policy manager 215 can then query the exploit objects 294 and resource objects 298 for exploit attribute and resource configuration information.

Figure 12:
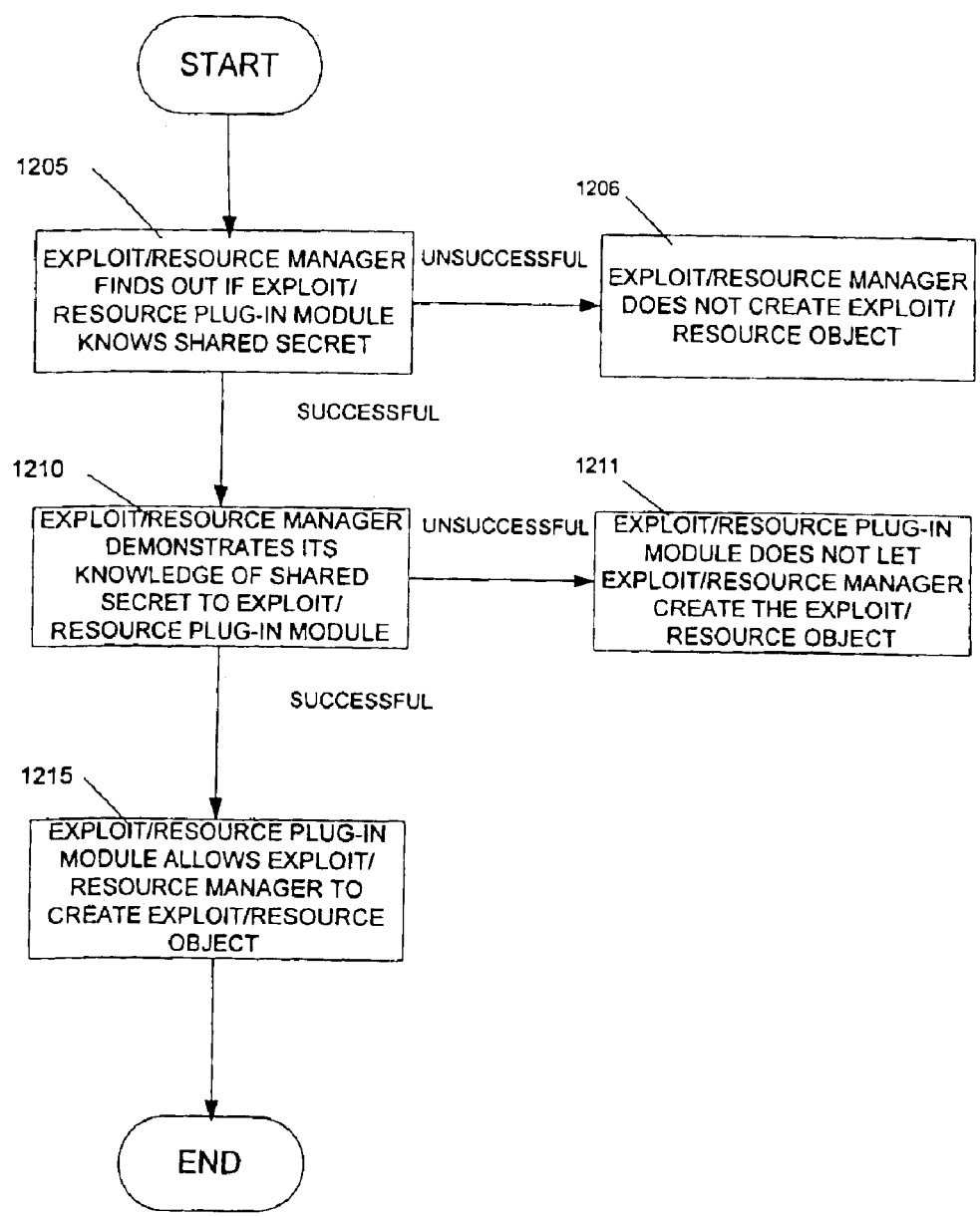
FIG. 12 is a flowchart diagram illustrating an exemplary method for running activation security and creating available exploit/resource objects.

FIG. 12 is a flowchart diagram illustrating an exemplary routine 1125 for running activation security and creating the available exploit objects 294 and resource objects 298 as set forth in FIG. 11. Activation security can implement a modified SKID3 protocol exchange where both sides demonstrate their knowledge of a shared secret. In step 1205, the exploit manager 230 and the resource manager 220 can find out if the exploit plug-in module 299 or the resource plug-in module 297 know the shared secret. In step 1206, if the exploit plug-in module 299 or the resource plug-in module 297 do not know the shared secret, the exploit manager 230 or resource manager 220 can refuse to create the exploit object 294 or resource object 298. In step 1210, once the plug-in module 299 or 297 has demonstrated its knowledge of the shared secret, the exploit manager 230 or resource manager 220 can demonstrate its knowledge of the shared secret. In step 1211, if the exploit manager 230 or the resource manager 220 do not know the shared secret, the plug-in module 299 or 297 can refuse access to its class factory. The class factory can be used to build the instances of the exploit object 294 or resource object 298. In step 1215, if the exploit manager 230 or the resource manager 220 has demonstrated its knowledge of the shared secret, the exploit manager 230 or resource manager 220 can allow access to the class factory to create the exploit object 294 or resource object 298 contained in the plug-in module 299 or 297.

Getting License, Policy and Host Information

Figure 13:
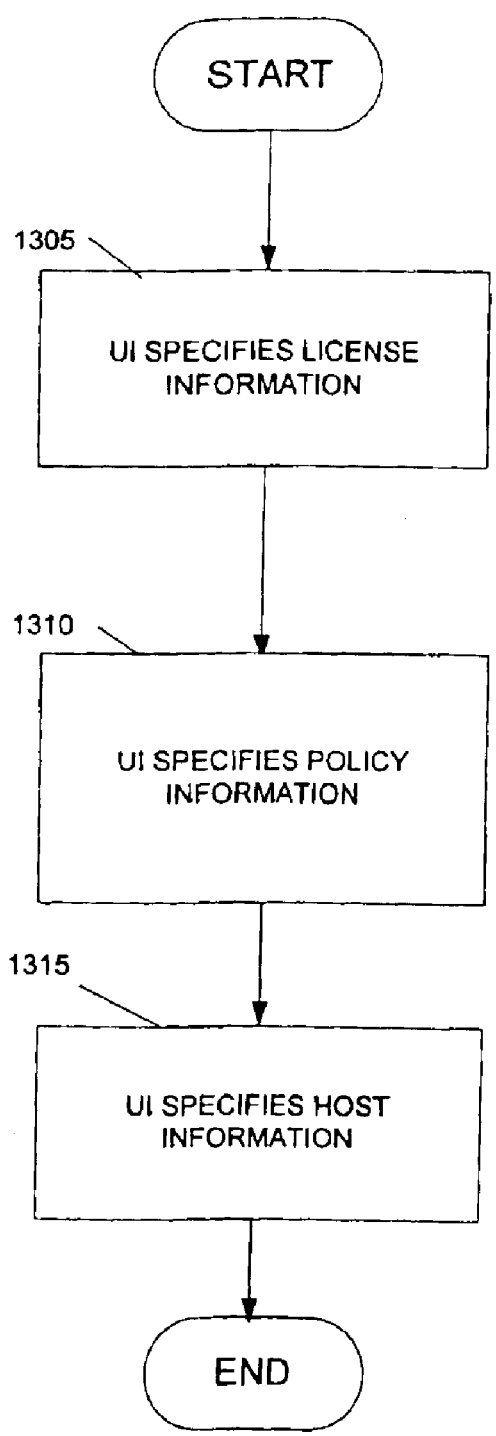
FIG. 13 is a flowchart diagram illustrating an exemplary method for getting license, policy and host information.

FIG. 13 is a flowchart diagram illustrating an exemplary routine 810 for getting license, policy and host information as set forth in FIG. 8. In step 1305, the UI 205 can specify the license information. In routine 1310, the UT 205 can specify the policy information. In step 1315, the UI 205 can specify the host information.

Figure 14:
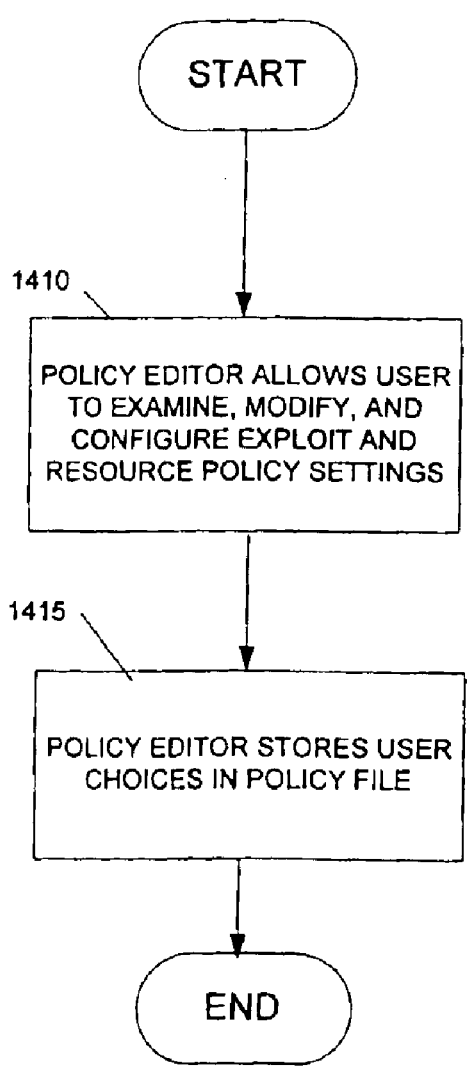
FIG. 14 is a flowchart diagram illustrating an exemplary method for getting policy information.

FIG. 14 is a flowchart diagram illustrating an exemplary routine 812 for getting policy information as set forth in FIG. 8. In step 1410, the policy editor 210 can allow the user to examine, modify and configure the policy settings of the available exploits and resources. In step 1415, the policy editor 210 can store the choices in a policy file.

Running Exploits

Figure 15:
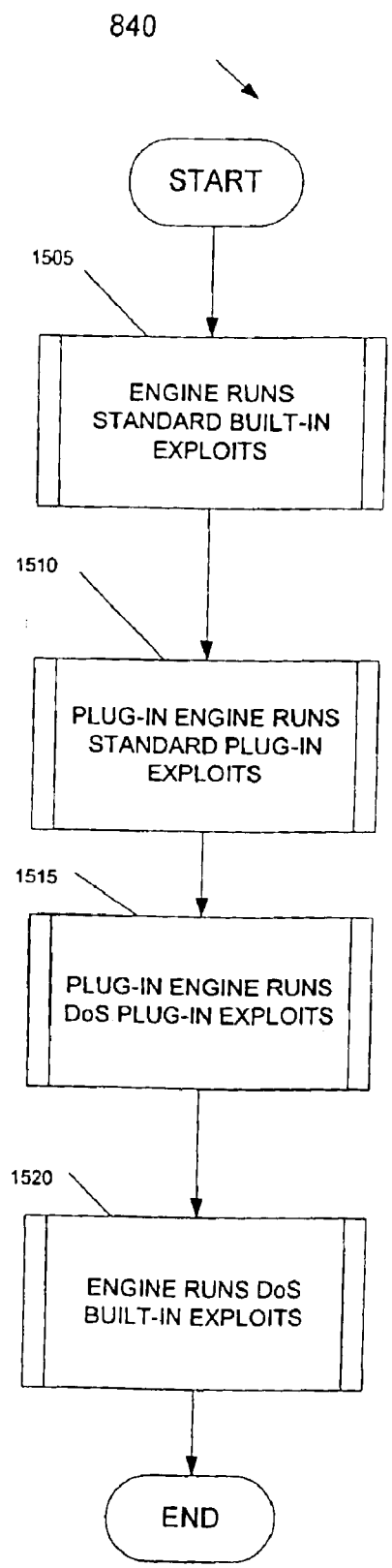
FIG. 15 is a flowchart diagram illustrating an exemplary method for running exploits.

FIG. 15 is a flowchart diagram illustrating an exemplary routine 840 for running the exploits as set forth in FIG. 8. The engine 270 includes a plug-in engine 275. The exploits can be denial-of-service (DoS) exploits or standard exploits. A DoS exploit may initiate a condition on a scanned host that damages its ability to perform some needed function. Typical DoS exploits may crash a running service. More severe DoS exploits may crash the host itself. DoS exploits, if enabled, can be scheduled to execute last to avoid interfering with the scanner's 37 ability to successfully execute other exploits. The standard exploits can be exploits that do not initiate a DoS condition. In routine 1505, the engine 270 can run the standard built-in exploits. In routine 1510, the plug-in engine 275 can run the standard plug-in exploits 291. In routine 1515, the plug-in engine 275 can run the DoS plug-in exploits 291. In routine 1520, the engine 270 can run the DoS built-in exploits.

Figure 16:
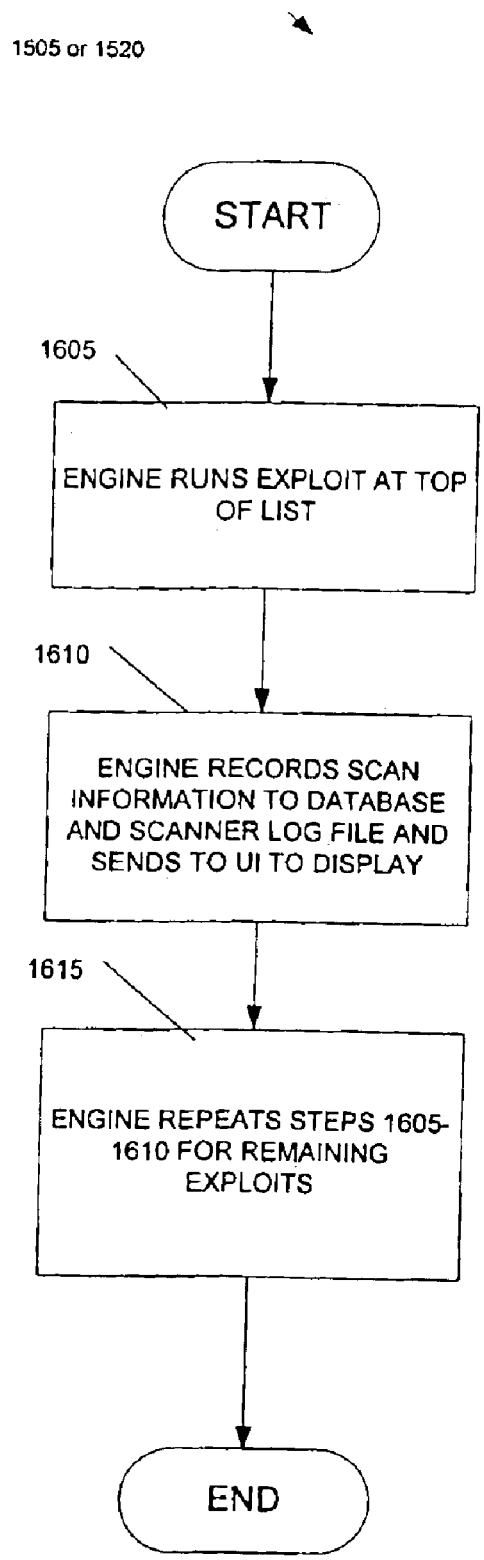
FIG. 16 is a flowchart diagram illustrating an exemplary method for running built-in exploits.

FIG. 16 is a flowchart diagram illustrating an exemplary routine 1505 or 1520 for running the built-in exploits as set forth in FIG. 15. The built-in exploits are in a list and the engine 270 can attempt to run the built-in exploits in the order they are put in the list. However, the engine 270 cannot run a built-in exploit if its resources are not yet available. Other exploits may need to be run to create the resources needed to run a particular built-in exploit. Multiple passes through the list may thus be necessary for the engine 270 to run all the built-in exploits in the list. In step 1605, the engine 270 can attempt to run the exploit at the top of the built-in exploit list. In step 1610, the engine 270 can record the scan result information to the database 290 and the scanner log file 295 and sends the scan result information to the UI 205 to display. In step 1615, the engine 270 can repeat steps 1605–1610 for the remaining built-in exploits in the list.

Figure 17:
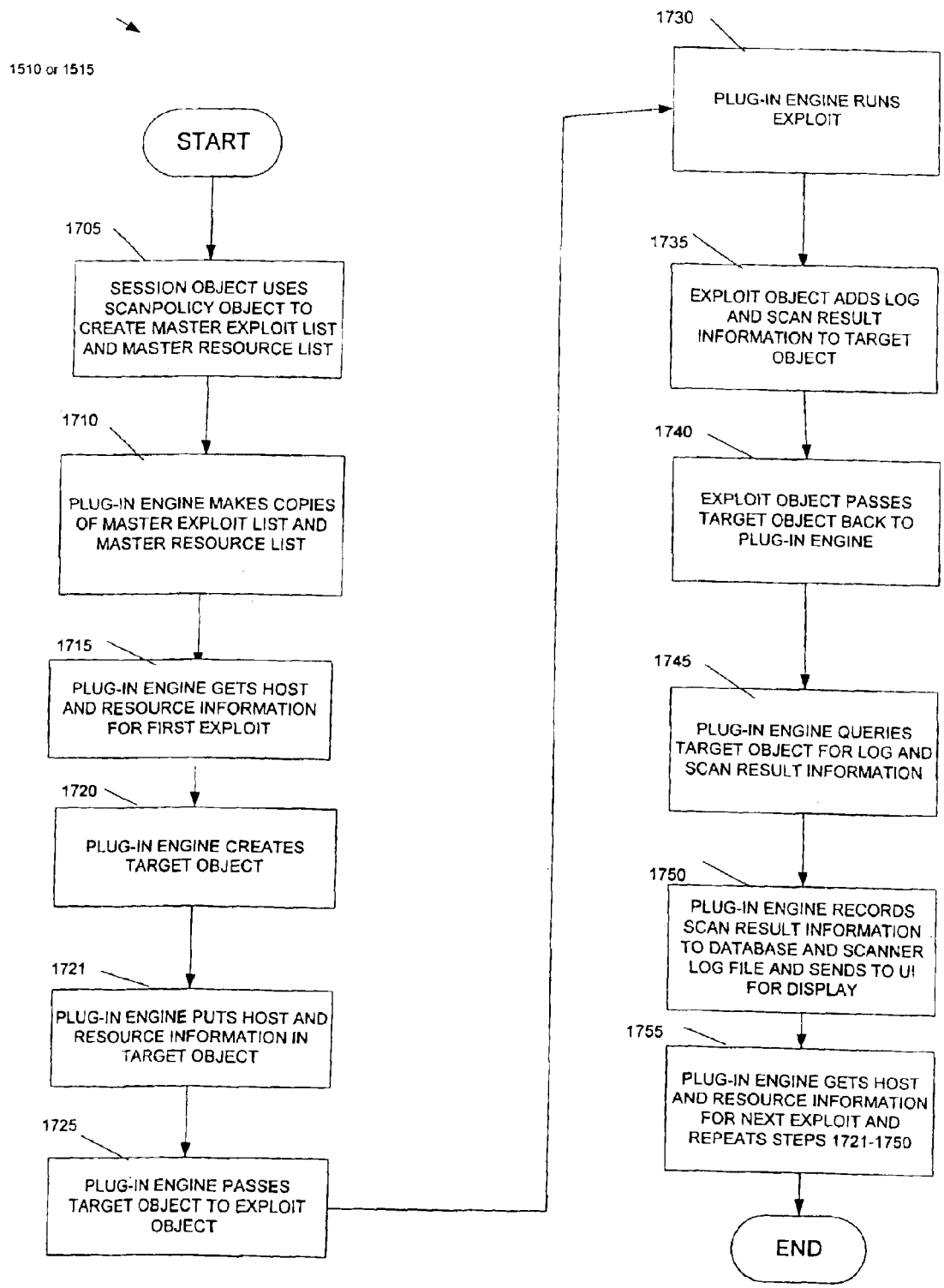
FIG. 17 is a flowchart diagram illustrating an exemplary method for running plug-in exploits.

FIG. 17 is a flowchart diagram illustrating an exemplary routine 1510 or 1515 for running the plug-in exploits 291 as set forth in FIG. 15. In step 1705, the session object 240 can use the scanpolicy object 245 to create the master exploit list 250 and the master resource list 255. In step 1710, the plug-in engine 275 can make copies of the master exploit list 250 and the master resource list 255. In step 1715, the plug-in engine 275 can get the host information and resources for the first exploit. In step 1720, the plug-in engine 275 can create a target object 280. In step 1721, the plug-in engine 275 can put the host information and resources in the target object 280. In step 1725, the plug-in engine 275 can pass the target object 280 to the exploit object 294. In step 1730, the plug-in engine 275 can run the plug-in exploit 291. In step 1735, the exploit object 294 can add the log and scan result information to the target object 280. In step 1740, the exploit object 294 can pass the target object 280 back to the plug-in engine 275. In step 1745, the plug-in engine 275 can query the target object 280 for the log and scan result information. In step 1750, the plug-in engine 275 can record the scan result information to the database 290 and the scanner log file 295 and sends it to the UI 205 for display. In step 1755, the plug-in engine 275 can get the host and resource information for the next exploit and can repeat steps 1721–1750.

Figure 18:
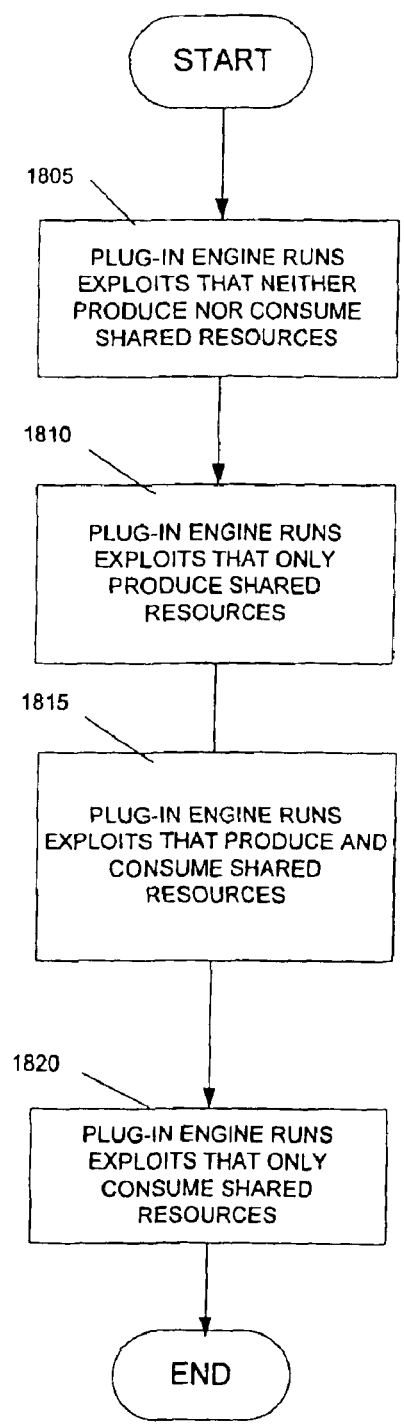
FIG. 18 is a flowchart diagram illustrating an exemplary method for determining an optimal order for running plug-in exploits.

FIG. 18 is a flowchart diagram illustrating an exemplary method for determining the optimal order for running both the standard and the DoS plug-in exploits 291. The existence of shared resources that are produced and consumed by various exploits can imply possible dependencies among exploits. These possible dependencies can exist only for mandatory resources. The plug-in engine 275 can schedule all producers of a mandatory shared resource to execute before any of the consumers of that resource. Each plug-in engine 275 can make a copy of the master exploit list 250 and master resource list 255 for each scanned host because the copied master lists 250 and 255 can continually change during each host scan.

The master exploit list 250 can be divided into four sections. The first section can include the exploits that neither produce nor consume resources. In step 1805, the plug-in engine 275 can first run these plug-in exploits 291.

The second section of the master exploit list 250 can include the exploits that only produce resources. In step 1810, the plug-in engine 275 can run these plug-in exploits 291. After each exploit is run, the copied master resource list 255 can be updated to indicate which resources have been created.

The third section of the master exploit list 250 can include the -exploits that both produce and consume. In step 1815, the plug-in engine 275 can run these plug-in exploits 291. The plug-in engine 275 can ask each of these exploit list 250 resources the exploit needs to run. For example, the copied master exploit list 250 can indicate that exploit 1 needs resources A, B, and C to run. The plug-in engine 275 can then go to the copied master resource list 255 and find out that exploits 5, 8, and 10 need to run to produce resources A, B, and C. Exploits 5, 8 and 10 can be run, producing A, B, and C. Then exploit 1 can be run using A, B, and C. This procedure of scheduling exploits that produce required resources to run prior to consumers of those resources can apply to exploits 5, 8, and 10. To make the process run smoothly, cyclic dependencies can be disallowed. Dependencies of standard exploits on DoS exploits can also be disallowed.

The fourth section of the master exploit list 250 can include the exploits that only consume resources. In step 1820, the plug-in engine 275 can run these plug-in exploits 291 last.

CONCLUSION

The present invention has been described in relation to particular embodiments which are intended in all respects to be illustrative rather than restrictive.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented process for identifying security vulnerabilities in a host computer system via a scanner comprising an engine, exploit manager, resource manager, and built-in exploits, comprising the steps of:

updating a capability of the scanner to conduct vulnerability assessments of the host computer system by obtaining a pluggable express update package, wherein the update package is configured as an independent plug-in module that is separate from the scanner and communicates with the scanner to support the vulnerability assessments by the scanner, the update package comprising:

an exploit plug-in module comprising exploit objects for exploits that check the host computer system for at least certain ones of the security vulnerabilities, the exploits representing modifications or updates to the built-in exploits of the scanner;

a resource plug-in module comprising resource objects representing resources that can be used by the scanner, the resources maintained as resource objects separate from the exploits of the exploit objects to support an independent updating of the resource objects and the exploit objects;

a dat file comprising exploit attribute information defining attribute information for the exploits of the exploit plug-in module, the exploit attribute information stored in a file separate from the exploit objects to support an independent updating of the dat file and the exploit objects; and a help file comprising on-line help information about the exploits of the exploit plug-in module, the help information stored in a file separate from the exploit objects to support an independent updating of the help file and the exploit objects;

supplying the exploit attribute information to the exploit manager from the dat file;

passing the exploit objects and the resource objects from the exploit manager and the resource manager to an engine of the scanner; and executing the exploits of the exploit plug-in module at the scanner.

2. The computer-implemented process of claim 1 wherein each of said resources can be assigned a namespace based upon the resource's scope.

3. The computer-implemented process of claim 1, wherein the step of executing exploits comprises the steps of:

running standard built-in exploits of the scanner;

running standard plug-in exploits of the pluggable express update package;

running denial of service plug-in exploits of the pluggable express update package; and running denial of service built-in exploits of the scanner.

4. The computer-implemented process of claim 3, wherein said steps of running standard and denial of service built-in exploits of the scanner comprises the steps of:

retrieving one of the built-in exploits at the top of a run-order list maintained by the scanner;

running the retrieved exploit;

recording exploit result information to a database and a scanner log file;

sending the exploit result information to a user interface; and repeating the above steps for the remaining built-in exploits.

5. The computer-implemented process of claim 3, wherein the steps of running standard and denial of service plug-in exploits of the pluggable express update package comprises the steps of:

copying from a session object a master exploit list and a master resource list;

obtaining exploit information from a scanpolicy object for one of the plug-in exploits;

creating a target object and placing the exploit information in the target object;

passing the target object to one of the exploit objects associated with the plug-in exploit;

running the plug-in exploit;

adding exploit result information to the target object;

passing the target object back to a plug-in engine of the scanner;

querying the target object for the exploit result information;

recording the exploit result information to a scanner log file and sending the exploit result information to a user interface; and repeating the above steps for the remaining plug-in exploits.

6. The computer-implemented process of claim 5, wherein said step of repeating the above steps for the remaining plug-in exploits comprises the steps of:

running a plug-in exploit that neither produces nor consumes shared resources;

running a plug-in exploit that only produces at least one of the shared resources;

running a plug-in exploit that produces and consumes at least one of the shared resources; and running a plug-in exploit that only consumes at least one of the shared resources.

7. The computer-implemented process of claim 6, wherein said step of running a plug-in exploit that produces and consumes at least one of the shared resources further comprises the step of ensuring that plug-in exploits that produce at least one of the shared resources consumed by the exploit are run before the plug-in exploit that produces and consumes at least one of the shared resources is run.

8. The computer-implemented process of claim 1, further comprising the step of initializing the scanner.

9. The computer-implemented process of claim 8, wherein the step of initializing a scanner comprises the steps of:

enumerating the exploit plug-in module and the resource plug-in module;

enumerating the exploit objects and the resource objects;

running a load security procedure for the exploit and the resource plug-in modules; and initializing a policy manager comprising at least one security policy that is retrievable by the engine of the scanner.

10. The computer-implemented process of claim 9, wherein the step of initializing a policy manager comprises the steps of:

identifying available exploits and available resources;

identifying available exploit objects and available resource objects corresponding to the available exploits and available resources;

generating maps that identify the exploit and the resource plug-in modules containing the available exploit objects and the available resource objects;

creating the available exploit objects and the common-setting resource objects; and querying the available exploit objects and the common-setting resource objects.

11. The computer-implemented process of claim 1, further comprising the step of receiving from a user interface a list of host computer systems the scan engine is authorized to scan, a list of the exploits for execution by the scanner, and the identity of at least one host computer system to scan for security vulnerabilities.

12. The computer-implemented process of claim 1, comprising the step of:

querying a session manager for available hosts to scan;

querying session object for one of the available hosts; and returning one of the available hosts to a host-scanning thread.

13. A computer-implemented process for identifying security vulnerabilities in a host computer system via a scanner comprising an engine, an exploit manager, a resource manager, standard built-in exploits and denial of service built-in exploits, comprising the steps of:

installing an express update package comprising an exploit plug-in module having exploit objects representing exploits that check the host computer system for vulnerabilities, the exploits comprising standard plug-in exploits and denial of service plug-in exploits; a resource plug-in module having resource objects representing resources for use by the scanner, a dat file comprising exploit attribute information; and a help file comprising on-line help information;

supplying the exploit attribute information from the dat file to the exploit manager of the scanner;

passing information about the exploit objects and resource objects from the exploit manager and the resource manager to the scanner engine;

running the standard built-in exploits and the denial of service built-in exploits by the scanner engine;

running the standard plug-in exploits and the denial of service plug-in exploits by a plug-in engine of the scanner, wherein the step of running the standard plug-in exploits and the denial of service plug-in exploits comprises the steps of:

(a) obtaining copies of a master exploit list and a master resource list from a session object;

(b) obtaining exploit information from a scanpolicy object for an identified one of the plug-in exploits;

(c) creating a target object and placing the exploit information in the target object;

(d) passing the target object to one of the exploit objects corresponding to the identified plug-in exploit;

(e) running the identified plug-in exploit;

(f) adding exploit result information to the target object;

(g) passing the target object to the plug-in engine;

(h) querying the target object for the exploit result information;

(i) recording the exploit result information to a scanner log file and sending the exploit result information to a user interface; and repeating steps (b)–(i) for each of the remaining standard and denial of service plug-in exploits.

14. The computer-implemented process of claim 13, wherein repeating the above steps for the remaining standard and denial of service plug-in exploits comprises the steps of:

running standard and denial of service plug-in exploits that neither produce nor consume at least one of the shared resources;

running standard and denial of service plug-in exploits that only produce at least one of the shared resources;

running standard and denial of service plug-in exploits that produce and consume at least one of the shared resources; and running standard and denial of service plug-in exploits that only consume at least one of the shared resources.

15. The computer-implemented process of claim 14, wherein said step of running standard and denial of service plug-in exploits that produce and consume at least one of the shared resources further comprises the step of ensuring that standard and denial of service plug-in exploits that produce at least one shared resource consumed by a particular exploit are run before the particular exploit is run.

16. The computer-implemented process of claim 13, further comprising the steps of:

enumerating the exploit plug-in module and the resource plug-in module and the exploit and the resource objects;

running load security for each of the exploit and resource plug-in modules; and initializing a policy manager comprising at least one security policy that is retrievable by the engine of the scanner.

17. The computer-implemented process of claim 16, wherein initializing a policy manager comprises the steps of:

identifying available exploits and available resources;

identifying available exploit objects and available resource objects corresponding to the available exploits and available resources; and generating maps that identify the exploit plug-in module and the resource plug-in module containing the available exploit objects and the available resource objects.

18. The computer-implemented process of claim 13, further comprising the step of receiving from the user interface a list of host computer systems that the scanner is authorized to scan, a list of exploits to be used to check the host computer system for security vulnerabilities, and the identity of the host computer system.

19. The computer-implemented process of claim 13, comprising the steps of:

querying a session manager for an identity of at least one host computer system to scan; and sending the identity of the at least one host computer system to the scanner engine.

20. A computer-implemented process for identifying security vulnerabilities in a host computer system via a scanner comprising a policy manager, an engine, an exploit manager and a resource manager, comprising the steps of:

installing an express update package comprising an exploit plug-in module having exploit objects representing exploits that check the host computer system for vulnerabilities the exploits comprising standard plug-in exploits and denial of service plug-in exploits;

a resource plug-in module having resource objects representing resources for use by the scanner; a dat file comprising exploit attribute information; and a help file comprising on-line help information;

initializing the scanner by completing the following steps:

enumerating the exploit plug-in module and the resource plug-in module and the exploit and the resource objects;

running load security for each of the exploit and resource plug-in modules; and initializing the policy manager, wherein the step of initializing the policy manager comprises the steps of:

requesting the exploit manager and the resource manager to identify available ones of the exploits and the resources;

using the exploit manager and the resource manager to query a registry for available ones of the exploit objects and the resource objects;

creating maps by the exploit manager and the resource manager, the maps identifying the exploit and resource plug-in modules containing the available exploit objects and the available resource objects;

issuing a request to the exploit manager and the resource manager to request the available exploit objects and common-setting resource objects;

returning the available exploit objects and the common-setting resource objects to the policy manager; and issuing a query from the policy manager to query the available exploit objects and the common-setting resource objects for corresponding exploit attribute information and resource configuration information;

supplying the exploit attribute information to the exploit manager from the dat file;

passing exploit object and resource object information from the exploit manager and the resource manager to the scanner engine; and executing the exploits at the scanner engine.

21. The computer-implemented process of claim 20, further comprising the step of receiving from the user interface a request to scan at least one host computer system for security vulnerabilities, the request comprising:

a list of host computer systems that the scanner is authorized to scan;

a list of exploits to be used to check the host computer system for security vulnerabilities; and the identity of at least one host computer system to scan for security vulnerabilities.

22. The computer-implemented process of claim 20, wherein the scanner further comprises built-in exploits comprising standard built-in exploits and denial of service built-in exploits.

23. The computer-implemented process of claim 22, wherein the step of executing exploits at the scanner engine comprises the steps of:

running the standard built-in exploits of the scanner;

running the standard plug-in exploits of the express update package;

running the denial of service plug-in exploits of the express update package; and running the denial of service built-in exploits of the scanner.

24. The computer-implemented process of claim 23, wherein the steps of running the standard and denial of service built-in exploits of the scanner comprise the steps of:

retrieving one of the built-in exploits at the top of a run-order list maintained by the scanner;

running the retrieved built-in exploit;

recording exploit result information to a database and a log file of the scanner;

sending the exploit result information to a user interface of the scanner; and repeating the above steps for the remaining built-in exploits.

25. The computer-implemented process of claim 23, wherein the steps of running the standard and denial of service plug-in exploits comprises the steps of:

creating a target object and placing the exploit attribute information in the target object;

passing the target object to one of the exploit objects;

running one of the plug-in exploits;

receiving exploit result information at the target object in response to running the plug-in exploit;

passing the target object back to the engine of the scanner;

recording the exploit result information to a log file of the scanner and passing the exploit result information to a user interface of the scanner; and repeating the above steps for the remaining plug-in exploits.

26. The computer-implemented process of claim 25, wherein repeating the above steps for the remaining plug-in exploits comprises the steps of:

running a plug-in exploit that neither produces nor consumes shared resources;

running a plug-in exploit that only produces at least one of the shared resources;

running a plug-in exploit that produces and consumes at least one of the shared resources; and running a plug-in exploit that only consumes at least one of the shared resources.

27. The computer-implemented process of claim 26, wherein the step of running a plug-in exploit that produces and consumes at least one of the shared resources further comprises the step of ensuring that the plug-in exploits that produce at least one shared resource consumed by the plug-in exploit are run before the plug-in exploit that produces and consumes at least one shared resource is run.

28. A computer-implemented process for identifying security vulnerabilities in a host computer system via a scanner comprising an engine, an exploit manager, a resource manager, standard built-in exploits and denial of service built-in exploits, and a user interface, comprising the steps of:

updating a capability of the scanner to conduct security vulnerability assessments of the host computer system by obtaining an update comprising an exploit plug-in module having exploit objects representing exploits that check the host computer system for vulnerabilities, the exploits comprising standard plug-in exploits and denial of service plug-in exploits; a resource plug-in module having resource objects representing resources for use by the scanner; and a file comprising exploit attribute information;

installing the update as an independent plug-in for operation in connection with the scanner;

supplying the exploit attribute information from the update to the exploit manager of the scanner;

passing information about the exploit objects and resource objects from the exploit manager and the resource manager to the scanner engine;

running the standard built-in exploits and the denial of service built-in exploits at the scanner engine;

running the standard plug-in exploits and the denial of service plug-in exploits at a plug-in engine of the scanner, wherein the step of running the standard plug-in exploits and the denial of service plug-in exploits comprises the steps of:

(a) obtaining copies of a master exploit list and a master resource list;

(b) obtaining host information and selected ones of the resources for an identified one of the plug-in exploits;

(c) providing the host information and the selected resources via a target object to one of the exploit objects corresponding to the identified plug-in exploit (e) running the identified plug-in exploit at the plug-in engine;

(f) adding scan result information to the target object in response to running the identified plug-in exploit;

(g) obtaining the scan result information from the target object for presentation via the user interface of the scanner; and repeating steps (b)–(g) for each of the remaining standard and denial of service plug-in exploits.

29. The computer-implemented process of claim 28, wherein repeating steps (b)–(g) for each of the remaining standard and denial of service plug-in exploits comprises the steps of:

running standard and denial of service plug-in exploits that neither produce nor consume at least one of the shared resources;

running standard and denial of service plug-in exploits that only produce at least one of the shared resources;

running standard and denial of service plug-in exploits that produce and consume at least one of the shared resources; and running standard and denial of service plug-in exploits that only consume at least one of the shared resources.

30. The computer-implemented process of claim 29, wherein said step of running standard and denial of service plug-in exploits that produce and consume at least one of the shared resources further comprises the step of ensuring that standard and denial of service plug-in exploits that produce at least one shared resource consumed by a particular plug-in exploit are run before the particular plug-in exploit is run.

31. The computer-implemented process of claim 28, further comprising the step of receiving from the user interface:

a list of host computer systems that the scanner is authorized to scan;

a list of exploits to be used to check the host computer system for security vulnerabilities, wherein the list comprises a selection of built-in and plug-in exploits, said selection made from the built-in exploits and the master exploit list; and the identity of at least one host computer system to scan for security vulnerabilities.

32. The computer-implemented process of claim 28, comprising the steps of:

querying a session manager for an identity of at least one host computer system to scan; and sending the identity of the at least one host computer system to the scanner engine.

33. The computer-implemented process of claim 28 further comprising the steps of:

enumerating the exploit plug-in module and the resource plug-in module and the exploit and the resource objects;

running load security for each of the exploit and resource plug-in modules; and initializing a policy manager comprising at least one security policy that is retrievable by the scanner engine.

34. The computer-implemented process of claim 33, wherein initializing a policy manager comprises the steps of:

identifying available exploits and available resources;

identifying available exploit objects and available resource objects corresponding to the available exploits and available resources; and generating maps that identify the exploit plug-in module and the resource plug-in module containing the available exploit objects and the available resource objects.

35. A computer-implemented process for identifying security vulnerabilities in a host computer system via a scanner comprising an engine, an exploit manager, a resource manager, standard built-in exploits and denial of service built-in exploits, comprising the steps of:

updating a capability of the scanner to conduct security vulnerability assessments of the host computer system by obtaining an update comprising an exploit plug-in module having exploit objects representing exploits that check the host computer system for vulnerabilities, the exploits comprising standard plug-in exploits and denial of service plug-in exploits; a resource plug-in module having resource objects representing resources for use by the scanner; and a file comprising exploit attribute information;

installing the update as an independent plug-in for operation in connection with the scanner;

supplying the exploit attribute information from the update to the exploit manager of the scanner;

passing information about the exploit objects and resource objects from the exploit manager and the resource manager to the scanner engine;

running the standard built-in exploits and the denial of service built-in exploits at the scanner engine;

running the standard plug-in exploits and the denial of service plug-in exploits at a plug-in engine of the scanner, wherein the step of running the standard plug-in exploits and the denial of service plug-in exploits comprises the steps of:

(a) obtaining copies of a master exploit list and a master resource list;

(b) obtaining host information and selected ones of the resources for an identified one of the plug-in exploits;

(c) providing the host information and the selected resources via a target object to one of the exploit objects corresponding to the identified plug-in exploit (e) running the identified plug-in exploit at the plug-in engine;

(f) adding scan result information to the target object in response to running the identified plug-in exploit;

(g) obtaining the scan result information from the target object for storage in a scanner log file; and repeating steps (b)–(g) for each of the remaining standard and denial of service plug-in exploits.

36. The computer-implemented process of claim 35, wherein repeating steps (b)–(g) for each of the remaining standard and denial of service plug-in exploits comprises the steps of:

running standard and denial of service plug-in exploits that neither produce nor consume at least one of the shared resources;

running standard and denial of service plug-in exploits that only produce at least one of the shared resources;

running standard and denial of service plug-in exploits that produce and consume at least one of the shared resources; and running standard and denial of service plug-in exploits that only consume at least one of the shared resources.

37. The computer-implemented process of claim 36, wherein said step of running standard and denial of service plug-in exploits that produce and consume at least one of the shared resources further comprises the step of ensuring that standard and denial of service plug-in exploits that produce at least one shared resource consumed by a particular plug-in exploit are run before the particular plug-in exploit is run.

38. The computer-implemented process of claim 35, further comprising the step of receiving from a user interface:

a list of host computer systems that the scanner is authorized to scan;

a list of exploits to be used to check the host computer system for security vulnerabilities, wherein the list comprises a selection of built-in and plug-in exploits, said selection made from the built-in exploits of the scanner and the master exploit list; and the identity of at least one host computer system to scan for security vulnerabilities.

39. The computer-implemented process of claim 35, further comprising the steps of:

querying a session manager for an identity of at least one host computer system to scan; and sending the identity of the at least one host computer system to the scanner engine.

40. The computer-implemented process of claim 35, further comprising the steps of:

enumerating the exploit plug-in module and the resource plug-in module and the exploit and the resource objects;

running load security for each of the exploit and resource plug-in modules; and initializing a policy manager comprising at least one security policy that is retrievable by the scanner engine.

41. The computer-implemented process of claim 40, wherein initializing a policy manager comprises the steps of:

identifying available exploits and available resources;

identifying available exploit objects and available resource objects corresponding to the available exploits and available resources; and generating maps that identify the exploit plug-in module and the resource plug-in module containing the available exploit objects and the available resource objects.

42. A computer-implemented process for identifying security vulnerabilities in a host computer system via a scanner comprising a policy manager, an engine, an exploit manager and a resource manager, comprising the steps of:

updating a capability of the scanner to conduct security vulnerability assessments of the host computer system by obtaining an update comprising an exploit plug-in module having exploit objects representing exploits that check the host computer system for vulnerabilities, the exploits comprising standard plug-in exploits and denial of service plug-in exploits; a resource plug-in module having resource objects representing resources for use by the scanner; a dat file comprising exploit attribute information; and a help file comprising on-line help information;

installing the update for use by the scanner;

initializing the scanner by completing the following steps:

enumerating the exploit plug-in module and the resource plug-in module and the exploit and the resource objects;

running load security for each of the exploit and resource plug-in modules; and initializing the policy manager, wherein the step of initializing the policy manager comprises the steps of:

identifying available ones of the exploits and the resources;

identifying the exploit and resource plug-in modules containing the available ones of the exploit objects and the resource objects corresponding to the available exploits and resources;

obtaining the available exploit objects and common-setting resource objects; and querying the available exploit objects and the common-setting resource objects for corresponding exploit attribute information and resource configuration information;

supplying the exploit attribute information to the exploit manager from the update passing exploit object and resource object information from the exploit manager and the resource manager to the scanner engine; and executing the exploits at the scanner engine.

43. The computer-implemented process of claim 42, further comprising the step of receiving from a user interface a request to scan the host computer system for security vulnerabilities, the request comprising:

a list of host computer systems that the scanner is authorized to scan;

a list of exploits to be used to check the host computer system for security vulnerabilities, the list comprising exploits selected from the available ones of the exploits; and the identity of the host computer system to scan for security vulnerabilities.

44. The computer-implemented process of claim 42, wherein the scanner further comprises built-in exploits comprising standard built-in exploits and denial of service built-in exploits.

45. The computer-implemented process of claim 44, wherein the step of executing exploits at the scanner engine comprises the steps of:

running the standard built-in exploits of the scanner;

running the standard plug-in exploits of the update;

running the denial of service plug-in exploits of the update; and running the denial of service built-in exploits of the scanner.

46. The computer-implemented process of claim 45, wherein the steps of running the standard and denial of service built-in exploits of the scanner comprise the steps of:

retrieving one of the built-in exploits from a list of built-in exploits maintained by the scanner;

running the retrieved built-in exploit against the host computer system;

recording exploit result information to a database of the scanner;

sending the exploit result information to a user interface of the scanner; and repeating the above steps for the remaining built-in exploits.

47. The computer-implemented process of claim 42, wherein executing the exploits at the scanner engine comprises the steps of:

creating a target object and placing the exploit attribute information in the target object;

passing the target object to one of the exploit objects;

running one of the plug-in exploits;

receiving exploit result information at the target object in response to running one of the plug-in exploits;

passing the target object back to the scanner engine;

recording the exploit result information to a log file of the scanner and passing the exploit result information to a user interface of the scanner; and repeating the above steps for the remaining plug-in exploits.

48. The computer-implemented process of claim 47, wherein repeating the above steps for the remaining plug-in exploits comprises the steps of:

running a plug-in exploit that neither produces nor consumes shared resources;

running a plug-in exploit that only produces at least one of the shared resources;

ensuring that the plug-in exploits that produce at least one of the shared resources consumed by the plug-in exploit are run before the plug-in exploit that produces and consumes at least one of the shared resources is run;

running a plug-in exploit that produces and consumes at least one of the shared resources; and running a plug-in exploit that only consumes at least one of the shared resources.

* * * * *